US010241565B2

United States Patent
Yamaguchi et al.

(10) Patent No.: US 10,241,565 B2
(45) Date of Patent: Mar. 26, 2019

(54) APPARATUS, SYSTEM, AND METHOD OF CONTROLLING DISPLAY, AND RECORDING MEDIUM

(71) Applicants: Hiroshi Yamaguchi, Kanagawa (JP); Fumiyo Kojima, Tokyo (JP); Takahiro Yagishita, Kanagawa (JP); Masaya Katoh, Kanagawa (JP)

(72) Inventors: Hiroshi Yamaguchi, Kanagawa (JP); Fumiyo Kojima, Tokyo (JP); Takahiro Yagishita, Kanagawa (JP); Masaya Katoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 220 days.

(21) Appl. No.: 14/742,831

(22) Filed: Jun. 18, 2015

(65) Prior Publication Data
US 2015/0370318 A1    Dec. 24, 2015

(30) Foreign Application Priority Data

Jun. 19, 2014  (JP) ................ 2014-126732
Aug. 29, 2014  (JP) ................ 2014-176544
Jun. 10, 2015  (JP) ................ 2015-117736

(51) Int. Cl.
| G06F 3/033 | (2013.01) |
| G09G 5/08 | (2006.01) |
| G06F 3/01 | (2006.01) |
| G06F 3/00 | (2006.01) |
| G06K 9/00 | (2006.01) |
| G09G 3/00 | (2006.01) |

(52) U.S. Cl.
CPC .............. G06F 3/005 (2013.01); G06F 3/017 (2013.01); G06K 9/00355 (2013.01); G06K 9/00369 (2013.01); G06K 9/00671 (2013.01); G09G 3/001 (2013.01); G09G 2354/00 (2013.01); G09G 2380/06 (2013.01)

(58) Field of Classification Search
CPC ..... G06F 3/017; G06F 3/005; G06K 9/00671; G06K 9/00369; G06K 9/00355
USPC .................................... 345/156–169
See application file for complete search history.

(56) References Cited

U.S. PATENT DOCUMENTS

| 4,876,571 A | 10/1989 | Nakamura et al. |
| 5,012,299 A | 4/1991 | Sawamura et al. |
| 2011/0193939 A1* | 8/2011 | Vassigh ................ G06F 3/011 348/46 |
| 2013/0063550 A1* | 3/2013 | Ritchey ................ G16H 40/63 348/36 |
| 2013/0074008 A1 | 3/2013 | Umezawa et al. |

(Continued)

FOREIGN PATENT DOCUMENTS

| JP | 7-073289 | 3/1995 |
| JP | 10-255052 | 9/1998 |

(Continued)

Primary Examiner — Kwin Xie
(74) Attorney, Agent, or Firm — Oblon, McClelland, Maier & Neustadt, L.L.P.

(57) ABSTRACT

In response to receiving a captured user image while the output image is being displayed to the user, display of the output image is controlled so as to reflect characteristics of the user that is determined based on the captured user image and a user instruction that is recognized based on the captured user image.

4 Claims, 26 Drawing Sheets

(56) References Cited

U.S. PATENT DOCUMENTS

| | | | |
|---|---|---|---|
| 2013/0162665 A1* | 6/2013 | Lynch | G01C 21/3647 345/589 |
| 2013/0307773 A1 | 11/2013 | Yagishita | |
| 2013/0345980 A1* | 12/2013 | van Os | G01C 21/3626 701/538 |
| 2014/0063058 A1* | 3/2014 | Fialho | G06T 11/60 345/633 |
| 2014/0205151 A1 | 7/2014 | Yagishita | |
| 2014/0253511 A1 | 9/2014 | Yagishita | |
| 2015/0070726 A1 | 3/2015 | Umezawa et al. | |

FOREIGN PATENT DOCUMENTS

| | | |
|---|---|---|
| JP | 2003-334389 | 11/2003 |
| JP | 2011-086213 | 4/2011 |
| JP | 2012-191568 | 10/2012 |

\* cited by examiner

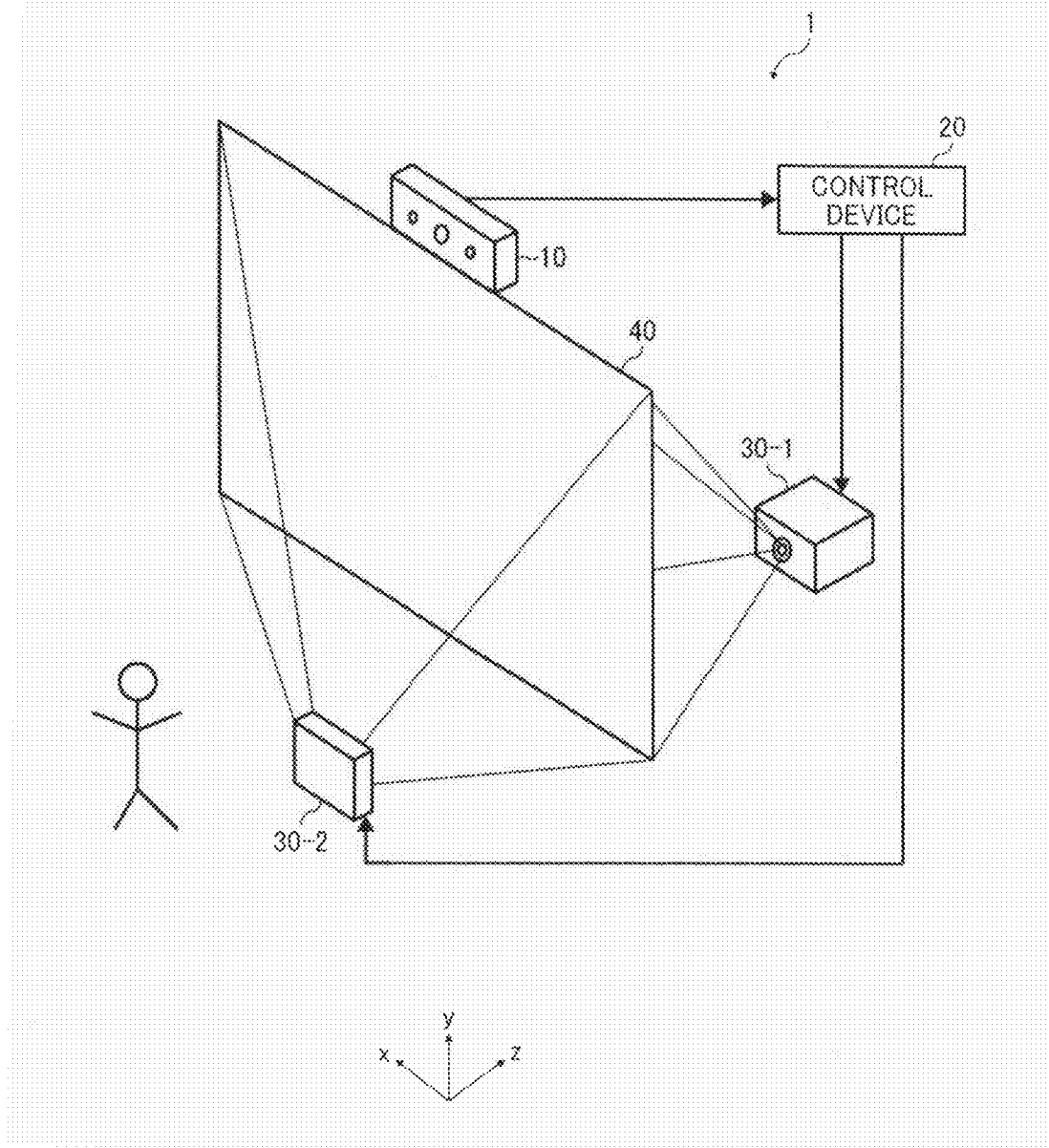

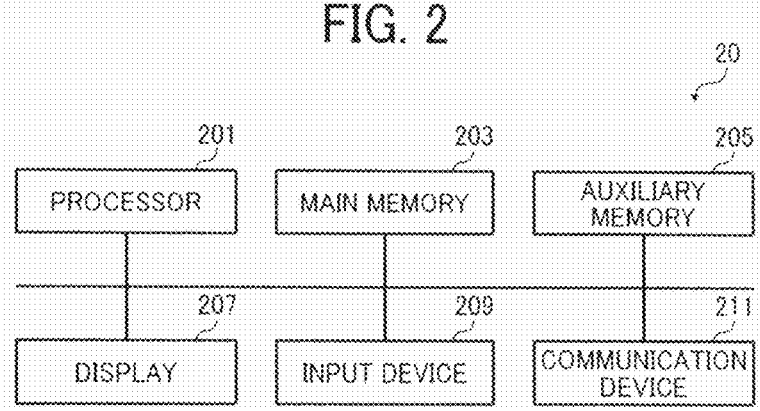
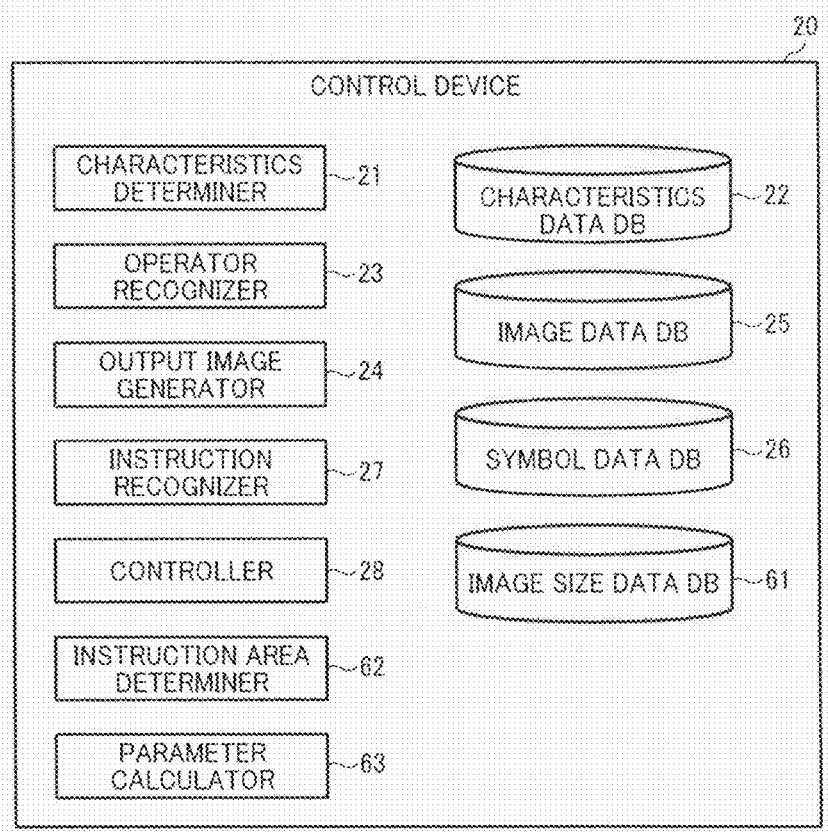

FIG. 4

| No. | ID | GENDER | BODY TYPE 1 | BODY TYPE 2 | BODY TYPE 3 | DOMINANT HAND | PERSONALITY | REGISTRATION DATE |
|---|---|---|---|---|---|---|---|---|
| 1 | 123ABC | FEMALE | HEIGHT A | BODY CENTER A | ARM LENGTH A | RIGHT | SLOW-TEMPO | YYMMDD |
| 2 | 234BCD | MALE | HEIGHT D | BODY CENTER B | ARM LENGTH B | LEFT | FAST-TEMPO | YYMMDD |
| ... | ... | ... | ... | ... | ... | ... | ... | ... |

22

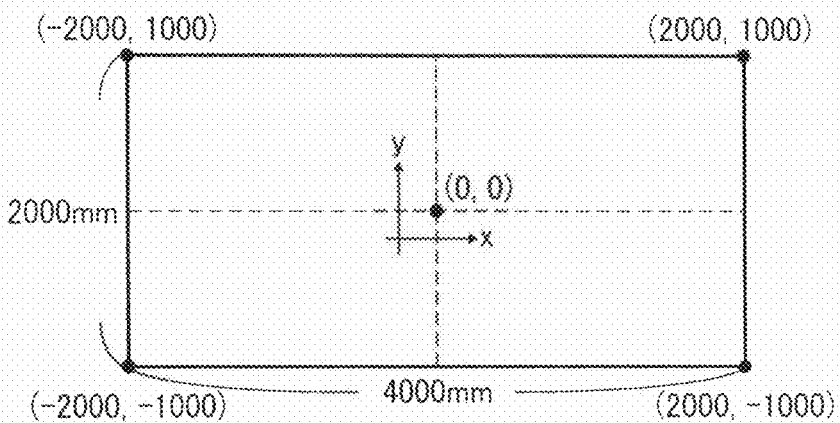
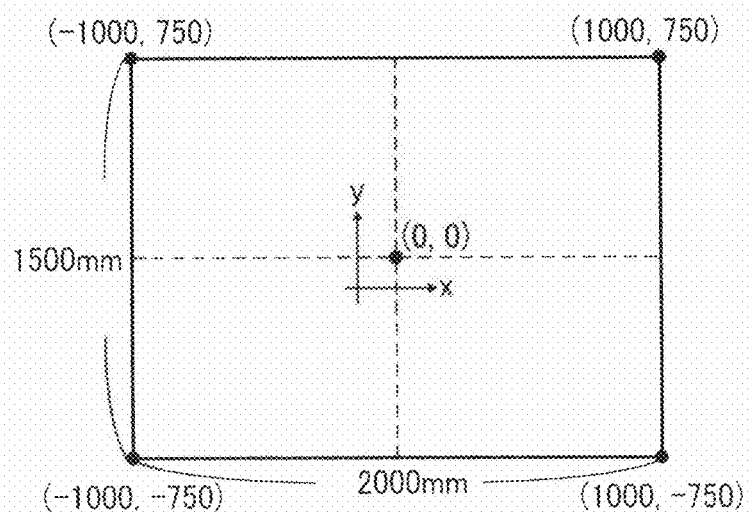

FIG. 8

| No. | IMAGE NAME | LOCA-TION | SIZE | TYPE | ... | ASSOCIATED IMAGE NAME | | | | | REGISTRA-TION DATE |
|---|---|---|---|---|---|---|---|---|---|---|---|
| | | | | | | ENTRANCE | MEETING ROOM | RECEPTION ROOM | WAITING ROOM | ... | |
| 1 | FLOOR A | HQ 1F | SIZE A | 3D | ... | ENTRANCE | WHEEL | MAIN STREET | STATION | ... | YYMMDD |
| 2 | FLOOR B | HQ 1F | SIZE B | 2D | ... | ... | ... | ... | ... | ... | YYMMDD |
| ... | ... | ... | ... | ... | ... | ... | ... | ... | ... | ... | ... |
| n | FLOOR A | HQ 9F | SIZE A | 3D | ... | NIGHT VIEW 1 | NIGHT VIEW 2 | DUSK | SUNNY | ... | YYMMDD |
| ... | ... | ... | ... | ... | ... | ... | ... | ... | ... | ... | ... |

FIG. 9

| No. | IMAGE NAME | IMAGE QUALITY | SIZE | TONE | RATING 1 | DISPLAY | ... | SHAPE | LAYER | REGISTRA-TION DATE |
|---|---|---|---|---|---|---|---|---|---|---|
| 1 | ENTRANCE | HIGH QUALITY | SIZE A | BRIGHT | 10 point | FLOATING A | ... | SPHERICAL RECTANGULAR | Mid | YYMMDD |
| 2 | MEETING ROOM | HIGH QUALITY | SIZE A | DARK | 20 point | FLOATING A | ... | SPHERICAL | Mid | YYMMDD |
| ... | ... | ... | ... | ... | ... | ... | ... | ... | ... | ... |
| n | WHEEL | HIGH QUALITY | SIZE B | GRAY | 40 point | FLOATING B | ... | SPHERICAL RECTANGULAR | Mid | YYMMDD |
| ... | ... | ... | ... | ... | ... | ... | ... | ... | ... | ... |

FIG. 12

| No. | CURSER NAME | TYPE | DISPLAY COLOR | COLOR STRENGTH | TRANSPARENCY | SIZE | ... | MOVING SPEED | LAYER | REGISTRATION DATE |
|---|---|---|---|---|---|---|---|---|---|---|
| 1 | CURSER A1 | CIRCULAR | BLUE | XX-XX | XX-XX | XX-XX | ... | XX-XX | Top | YYMMDD |
| 2 | CURSER A2 | CIRCULAR | RED | XX-XX | XX-XX | XX-XX | ... | XX-XX | Top | YYMMDD |
| ... | ... | ... | ... | ... | ... | ... | ... | ... | ... | ... |
| n | CURSER N | RECTANGULAR | BLUE | XX-XX | XX-XX | XX-XX | ... | XX-XX | Top | YYMMDD |
| ... | ... | ... | ... | ... | ... | ... | ... | ... | ... | ... |

FIG. 13

| No. | BAR NAME | TYPE | DISPLAY COLOR | COLOR STRENGTH | TRANSPARENCY | SIZE | ... | EXPANSION/ CONTRACTION SPEED | LAYER | REGISTRATION DATE |
|---|---|---|---|---|---|---|---|---|---|---|
| 1 | BAR A1 | STRAIGHT LINE | BLUE | XX-XX | XX-XX | XX-XX | ... | XX-XX | Top | YYMMDD |
| 2 | BAR A2 | STRAIGHT LINE | RED | XX-XX | XX-XX | XX-XX | ... | XX-XX | Top | YYMMDD |
| ... | ... | ... | ... | ... | ... | ... | ... | ... | ... | ... |
| n | BAR N | DASHED LINE | BLUE | XX-XX | XX-XX | XX-XX | ... | XX-XX | Top | YYMMDD |
| ... | ... | ... | ... | ... | ... | ... | ... | ... | ... | ... |

FIG. 19

| No. | NAME | ID | ORGANIZATION | IMAGE OPERATION AUTHORITY | | | | REGISTRATION DATE |
|---|---|---|---|---|---|---|---|---|
| | | | | REGISTER | DELETE | EDIT | REFER | |
| 1 | Oshima, Fumiyo | 123ABC | DESGIN CENTER | ○ | ○ | ○ | ○ | YYMMDD |
| 2 | Kawaguchi, Hiroshi | 234BCD | SALES CENTER | × | × | × | ○ | YYMMDD |
| ... | ... | ... | ... | ... | ... | ... | ... | ... |

APPARATUS, SYSTEM, AND METHOD OF CONTROLLING DISPLAY, AND RECORDING MEDIUM

CROSS-REFERENCE TO RELATED APPLICATIONS

This patent application is based on and claims priority pursuant to 35 U.S.C. § 119(a) to Japanese Patent Application Nos. 2014-126732, filed on Jun. 19, 2014, 2014-176544, filed on Aug. 29, 2014, and 2015-117736, filed on Jun. 10, 2015, in the Japan Patent Office, the entire disclosure of which is hereby incorporated by reference herein.

BACKGROUND

Technical Field

The present invention generally relates to an apparatus, system, and method of controlling display, and a display control program stored in a non-transitory recording medium.

Description of the Related Art

Recently, communication tools are employed, which display a large-size image to attract the user's attention. While display of the large-size image has been attractive, the user has been still using a remote controller to send an instruction to change display content of the large-size image.

SUMMARY

Example embodiments of the present invention include an apparatus, system, and method of controlling display of an output image, and a non-transitory recording medium storing a display control program. In response to receiving a captured user image while the output image is being displayed to the user, display of the output image is controlled so as to reflect characteristics of the user that is determined based on the captured user image and a user instruction that is recognized based on the captured user image.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 1 is an illustration of a configuration of an information processing system according to an example embodiment of the present invention;

FIG. 2 is a schematic block diagram illustrating a hardware structure of a control device of the information processing system of FIG. 1;

FIG. 3 is a schematic block diagram illustrating a functional structure of the control device of FIG. 2;

FIG. 4 is an illustration of an example data structure of characteristics data;

FIG. 5 is an illustration of example output image having a preset image size;

FIG. 6 is an illustration of an instruction area of the output image of FIG. 5 that is specific to a user;

FIG. 8 is an illustration of an example data structure of map image data;

FIG. 9 is an illustration of an example data structure of icon image data;

FIG. 12 is an illustration of an example data structure of cursor data;

FIG. 13 is an illustration of an example data structure of bar data;

FIG. 19 is an illustration of an example data structure of authority data;

Figure 7:
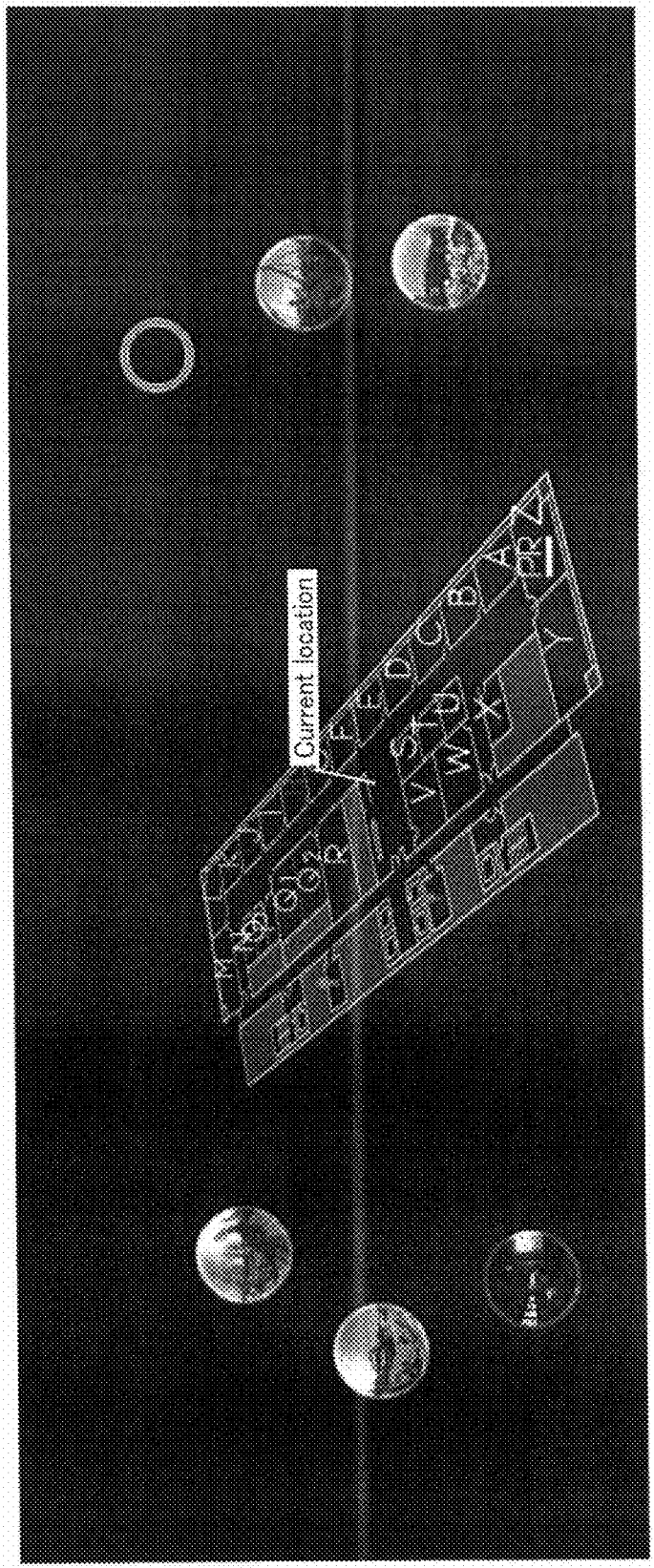
FIG. 7 is an illustration of an example output image that is initially displayed to a user, generated by the control device of FIG. 3.

The accompanying drawings are intended to depict example embodiments of the present invention and should not be interpreted to limit the scope thereof The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to the drawings, controlling content of an image being displayed according to interaction with a user is explained according to embodiments of the present invention.

FIG. 1 is a schematic diagram illustrating a configuration of an information processing system 1, according to an example embodiment of the present invention. As illustrated in FIG. 1, the information processing system 1 includes an image capturing device 10, a control device 20, a first projector 30-1, and a second projector 30-2. In FIG. 1, a projection medium 40 is also illustrated.

The image capturing device 10 captures an image of a user ("user image"), when the user enters an image capturing area of the image capturing device 10. The image capturing device 10 may be implemented by a depth camera of any kind, which is capable of retrieving depth information about a scene from the captured image, in addition to retrieving color information from the captured image. The depth camera 10 may be provided with any desired sensor such as a motion sensor, and the number of sensors is not limited to one. Further, the image capturing device 10 may capture a video image, or sequentially capture still images. In this example, the image capturing device 10 continuously captures the video image of the user, as long as the user resides in the image capturing area of the image capturing device 10. Further, the number of image capturing devices 10 is not limited one.

The control device 20 may be implemented by any desired information processing apparatus capable of processing data, such as a computer with one or more processors. The control device 20 analyzes the user image captured by the image capturing device 10 to determine characteristics of the user. More specifically, the control device 20 controls parameters of the output image, such as size or coordinate of an instruction area or display content of the output image, such that the output image reflects the characteristics of the user that is determined based on the captured user image. The control device 20 further analyzes the captured user image to recognize user instruction (such as pose or gesture) to the output image, and controls display content of the output image such that the output image reflects the user instruction.

The projectors 30-1 and 30-2 may each be implemented by any desired projector capable of projecting the output image generated by the control device 20 onto the projection medium 40. The projector 30-1 may be referred to as a rare projector, and the projector 30-2 may be referred to as a front projector. Alternatively, only one projector such as the rare projector 30-1 may be used for the system of FIG. 1, or more than two projectors may be used for the system of FIG. 1. For simplicity, however, the projectors 30-1 and 30-2 may be collectively referred to as the projector 30.

The projection medium 40 is any desired medium on which the output image is projected, such as a screen. In this example, the projection medium 40 is implemented by a large-size screen of about 200 inches. While the screen of any desired size may be used, the screen preferably has a size larger than a standard-size of human, so that user's instruction onto the output image being displayed on the screen can be captured.

FIG. 2 is a schematic block diagram illustrating a hardware structure of the control device 20 according to an example embodiment of the present invention. As illustrated in FIG. 2, the control device 20 is implemented by a general-purpose computer. The control device 20 of FIG. 2 includes a processor 201 such as a central processing unit (CPU) or a graphical processing unit (GPU), a memory 203 such as a read only memory (ROM) or a random access memory (RAM), an auxiliary memory 205 such as a hard disk drive (HDD) or a solid state device (SSD), a display 207, an input device 209 such as a mouse, keyboard, and/or touch panel, and a communication device 211 that may be implemented by a communication interface such as a network interface circuit. When the input device 209 is implemented by a touch panel, the display 207 and the input device 209 are incorporated as one device. The auxiliary memory 205, display 207, input device 209, and communication device 211 may be incorporated into a body of the computer (control device 20), or may be provided separately from the body of the computer (control device 20) as long as they are communicable with the computer. Alternatively, the display 207 and the input device 209 may not be provided in the control device 20, for example, when the control device 20 functions as a server.

FIG. 3 is a schematic block diagram illustrating a functional structure of the control device 20. As illustrated in FIG. 3, the control device 20 includes a characteristics determiner 21, a characteristics data database (DB) 22, an operator recognizer 23, an output image generator 24, an image data DB 25, a symbol data DB 26, an instruction recognizer 27, a controller 28, an image size data DB 61, an instruction area determiner 62, and a parameter calculator 63.

The functions of any one of the characteristics determiner 21, operator recognizer 23, output image generator 24, instruction recognizer 27, controller 28, instruction area determiner 62, and parameter calculator 63 may be implemented by the processor 201 of FIG. 2, which operates according to display control program stored in a memory such as in the main memory 203.

The characteristics data DB 22, image data DB 25, symbol data DB 26, and image size data DB 61 may be implemented by any desired memory such as the auxiliary memory 205, which operates under control of the processor 201.

The characteristics determiner 21 determines characteristics of a user, based on a user image captured by the image capturing device 10, and stores information regarding the determined characteristics of the user ("characteristics data") in the characteristics data DB 22, for example, in the form of characteristics data table as illustrated in FIG. 4. In this example, the control device 20 receives the captured image from the image capturing device 10 through the communication device 211, which may be implemented by a network interface circuit.

Examples of the characteristics of the user include, but not limited to, physical attribute of the user such as gender, age, user's body type such as height or center of gravity of the user's body, dominant arm, etc., and any information that can derive from the physical attribute of the user such as personality or attitude of the user.

In example operation, the characteristics determiner 21 obtains, using the captured user image, a distance between specific parts of the user and/or coordinate positions of specific part of the user, to analyze physical attribute of the user such as height, arm length, etc. In this example, the X axis is the horizontal direction of the image capturing device 10, the Y axis is the vertical direction of the image capturing device 10, and the Z axis is the direction orthogonal to the X-Y plane. Further, the distances and the coordinate positions are obtained relative to the center of the captured image, such that the image center (x, y) is treated as the reference point (0, 0). However, the reference point may be at any other point in the image.

For example, the characteristics determiner 21 recognizes the specific parts of the user, including, for example, head, right and left shoulders, right and left elbows, right and left wrists, right and left hands, spine, hip center, right and left hips, right and left knees, right and left feet, etc. Using the information regarding the body parts, the characteristics determiner 21 further estimates height (head-foot distance), shoulder width (right shoulder-left shoulder distance), arm length (shoulder-hand distance, or shoulder-elbow-hand distance), upper body center (such as spine or hip center), etc.

The characteristics determiner 21 may additionally analyze the overall skeleton frame, which can be obtained from the recognized body parts, to determine a gender of the user, and/or determine whether the user is an adult or a child.

The characteristics determiner 21 may additionally analyze, using the captured user image, a hand that the user firstly moves, or frequency of the hand that the user moves for each hand, to determine a dominant hand of the user.

The characteristics determiner 21 may additionally analyze, using the captured user image, speed of movement of the hand or the arm of the user to determine personality of the user. For example, when the movement of the user's hand is equal to or greater than a threshold, the characteristics determiner 21 determines that the user is fast-tempo. When the movement of the user's hand is less than the threshold, the characteristics determiner 21 determines that the user is slow-tempo.

As illustrated in FIG. 4, the characteristics determiner 21 stores at least a part of the analysis result as the characteristics data in association with identification information for identifying the user ("ID") and the registration date. The identification information may be automatically assigned by the control device 20, at the time of registering characteristics data. The registration date is the date at which the characteristics data is registered.

In this example referring to FIG. 4, the characteristics data DB 22 stores, for each user, the gender, body type such as height, body center, and arm length, dominant hand, personality such as whether the user is fast-tempo or slow-tempo, and the registration date.

Referring back to FIG. 3, the operator recognizer 23 recognizes the user, who is an operator operating the system 1, based on the captured user image captured by the image capturing device 10. In this example, the operator recognizer 23 uses the analysis result of the characteristics determiner 21, to identify the user who is located within a predetermined distance (for example, within a few meters) from the image capturing device 10, and has a gesture or pose indicating that the user starts giving instructions. The operator recognizer 23 determines that the user has a gesture or pose indicating that the user starts giving instructions, when a distance between an arm (right or left) and the head in Y direction is within a given threshold (that is, the Y-coordinate difference between the arm and the head is equal to or lower than the threshold A), and a distance between the arm (right or left) and the head in Z direction is equal to or greater than a given threshold (that is, the Z-coordinate difference between the arm and the head is equal to or greater than the threshold B). For simplicity, this user's gesture or pose indicating that the user starts giving instructions is referred to as an instructing pose.

In this example, if the difference between the right arm (but not left arm) and the head of the user in Y direction is equal to or less than the threshold A, and the difference between the right arm (but not left arm) and the head of the user in Z direction is equal to or greater than the threshold B, only the right arm of the user is recognized as it has the instructing pose. In such case, only one or more icons that correspond to the right hand (arm) will be operable, while one or more icons that correspond to the left hand (arm) that does not have the instructing pose will not be operable. The threshold A is determined based on the Y coordinate of the head. More specifically, since the height of the user correlates with the arm length, the threshold A becomes less as the Y coordinate of the head is less.

When there is more than one user who is determined to be an operator, the operator recognizer 23 calculates a distance of each user (operator) from the image capturing device 10, and selects one of the users who is located closest to the image capturing device 10 as the operator who is operating the system 1.

The operation recognizer 23 then obtains the coordinate of at least one hand of the user (operator) having the instructing pose.

The image size data DB 61 stores size information indicating the size of an output image to be projected onto the projection medium 40. The size of the output image for projection onto the projection medium 40 is determined based on a distance between the projector 30 and the projection medium 40 ("projection distance"). For example, the image size data DB 61 previously stores (registers) size information indicating the output image size, in association with the projection distance, according to inputs from the administrator of the information processing system 1. Accordingly, the initial size of the output image is determined based on the setting of the projector 30 with respect to the projection medium 40.

In this example, as illustrated in FIG. 5, the output image has a vertical length of 2000 mm, a horizontal length of 4000 mm, with the center (x, y) of the output image being the reference (0, 0).

The instruction area determiner 62 determines a size and/or a location (coordinate) of an instruction area of the user, who is recognized as the operator by the operator recognizer 23. The instruction area is determined to have a size, which can be easily reached by the user (operator). For example, the horizontal length of the instruction area may be set substantially equal to the sum of the left arm length, the shoulder width, and the right arm length. The vertical length of the instruction area may be set substantially equal to twice of the left arm length, twice of the right arm length, or the sum of the left arm length and the right arm length. The reference (x, y) of the instruction area may be defined: x=x coordinate of left shoulder+x coordinate of right shoulder/2; y=y coordinate of left shoulder+y coordinate of right shoulder/2. As described above, the left arm length, shoulder width, right arm length, (x, y) coordinate of left shoulder, and (x, y) coordinate of right shoulder are obtained from the analysis result of the characteristics determiner 21, which is stored in the memory.

In this example, as illustrated in FIG. 6, it is assumed that the instruction area determiner 62 determines a size and location (coordinate) of an instruction area, such that the instruction area has a vertical length of 1500 mm and a horizontal length of 2000 mm, with the center of the instruction area being the reference (0, 0).

The parameter calculator 63 calculates a parameter for defining a location of a content (such as cursor) to be displayed on the output image, based on the output image size that is stored in the image size data DB 61 and the instruction area size that is determined by the instruction area determiner 62. The parameter Px defines the X coordinate of content, which can be obtained as a ratio of the X-direction length of the output image to the X-direction length of the instruction area. The parameter Py defines the Y coordinate of content, which can be obtained as a ratio of the Y-direction length of the output image to the Y-direction length of the instruction area. In the example referring to FIGS. 5 and 6, the parameter Px is 4000/2000=2, and the parameter Py is 2000/1500=1.25.

In the above-described example, it is assumed that the user (operator) is located at, or closely enough to, the center of the output image in the X direction (x=0). In such case, the parameter calculator 63 does not take into account the user's location to calculate a parameter.

Alternatively, if the user's location is away from the center (0, 0) of the output image, the parameter calculator 63 calculates a parameter, while taking into account the user's location in the X direction. For example, when the user's location has the x coordinate "1000" with respect to the "0" of the output image, the parameter PRx for correcting the right x-direction becomes |(2000−1000)/1000|=1, and the parameter PLx for correcting the left x-direction becomes |(−2000−1000)/1000|=3. The parameter Py for correcting the Y-direction is 2000/1500=1.25.

The image capturing device 10 captures the output image that is projected onto the projection medium 40 along with the user, to obtain the captured image including the captured user image and the captured output image. The operator recognizer 23 analyzes the x-coordinate of the center body of the user in the user image, in relation to the captured output image in the x-direction to determine the location of the user in the x-direction with respect to the output image.

The output image generator 24 generates an output image for projection through the projector 30. For example, the output image generated by the output image generator 24 is transmitted to the projector 30, through the communication device 211. In this example, as illustrated in FIG. 7, the output image corresponds to an image of a floor map ("map image"), and a plurality of icons that correspond to specific places such as rooms shown on the floor map image. The output image of FIG. 7 is projected onto the projection medium 40, as a menu screen of the information processing system 1, as soon as the user is recognized as the operator for the system 1. The output image that is initially displayed as the menu image, is not limited to this example. In this disclosure, while specific places to be shown on the map image are not limited to "rooms", such places will be referred to as "rooms" for simplicity.

In this example, the icon is a spherical panorama image, which is captured by 360 degree spherical panoramic camera. In response to selection of a specific icon by the operator, which is recognized by the instruction recognizer 27 under control of the controller 28, the output image is switched to a spherical panorama image that is associated with the selected icon.

The image data DB 25 stores information regarding the map image, and information regarding the icons to be shown on the map image, in association with each other. FIG. 8 illustrates a map image table stored in the image data DB 25, which stores information regarding a plurality of map images each showing a floor map. FIG. 9 illustrates an icon image table stored in the image data DB 25, which stores information regarding a plurality of icon images to be displayed with at least one of the map images in the table of FIG. 8. The map image table of FIG. 8 associates the map image to be displayed, with one or more icon images to be displayed with the map image. For example, the first record in the table of FIG. 8 shows that the map image with the image name "floor A" is to be displayed with the icon images "entrance", "meeting room", "reception room", and "waiting room", each of which are defined in the icon image table of FIG. 9. The icon images to be displayed with the map image correspond to the respective rooms located on that floor.

Each map image in the map image table of FIG. 8 is stored with coordinate data indicating specific locations of respective rooms. Each icon image in the icon image table of FIG. 9 is stored with coordinate data indicating the location at which the icon image, that is the spherical panorama image, is captured. Using the coordinate data of the icon images and the coordinate data of rooms in the map image, each icon image can be displayed on the map image, at a location where the corresponding room is displayed.

The map image data in the map image table of FIG. 8 and the icon image data in the icon image table of FIG. 9, which are stored in the image data DB 25, may be registered or updated by the administrator of the information processing system 1 or the user if the user is authorized to edit information.

In this example, the output image generator 24 controls display of each icon image of the map image, according to the icon image data as illustrated in FIG. 9.

For example, the output image generator 24 determines image quality, display size, tone, shape, layer, etc., of each icon image, according to corresponding information stored in the icon image table of FIG. 9.

Further, in this example, the output image generator 24 arranges display locations of the icon images, which are associated with the map image, such that the icon images appear as floating on the map image. The way each icon image floats, is defined by the icon image data stored in the image data DB 25. For example, the coordinate, the floating direction, the width, or timing, define the way each icon image floats. In this example illustrated in FIG. 9, such as the floating type A or floating type B may be selected, which differ in the above-described characteristics.

Additionally or alternatively, the output image generator 24 may determine appearance of each icon image, such as image quality, size, shape, color, color tone, or floating type of each icon image, according to a rating, registration date, and/or a number of times the icon image is selected by the user. For example, when the rating of the icon image is greater than a threshold value "1", that icon image may be displayed in larger size than its default size. For example, the rating may reflect the number of times that icon is selected by the user, such that it reflects popularity of the room. In another example, when the difference between the current date and the registration date is less than a threshold value, that icon image may be displayed in larger size than its default size. For example, if there is a new room that is recently registered, such room is shown in larger size.

Figure 10:
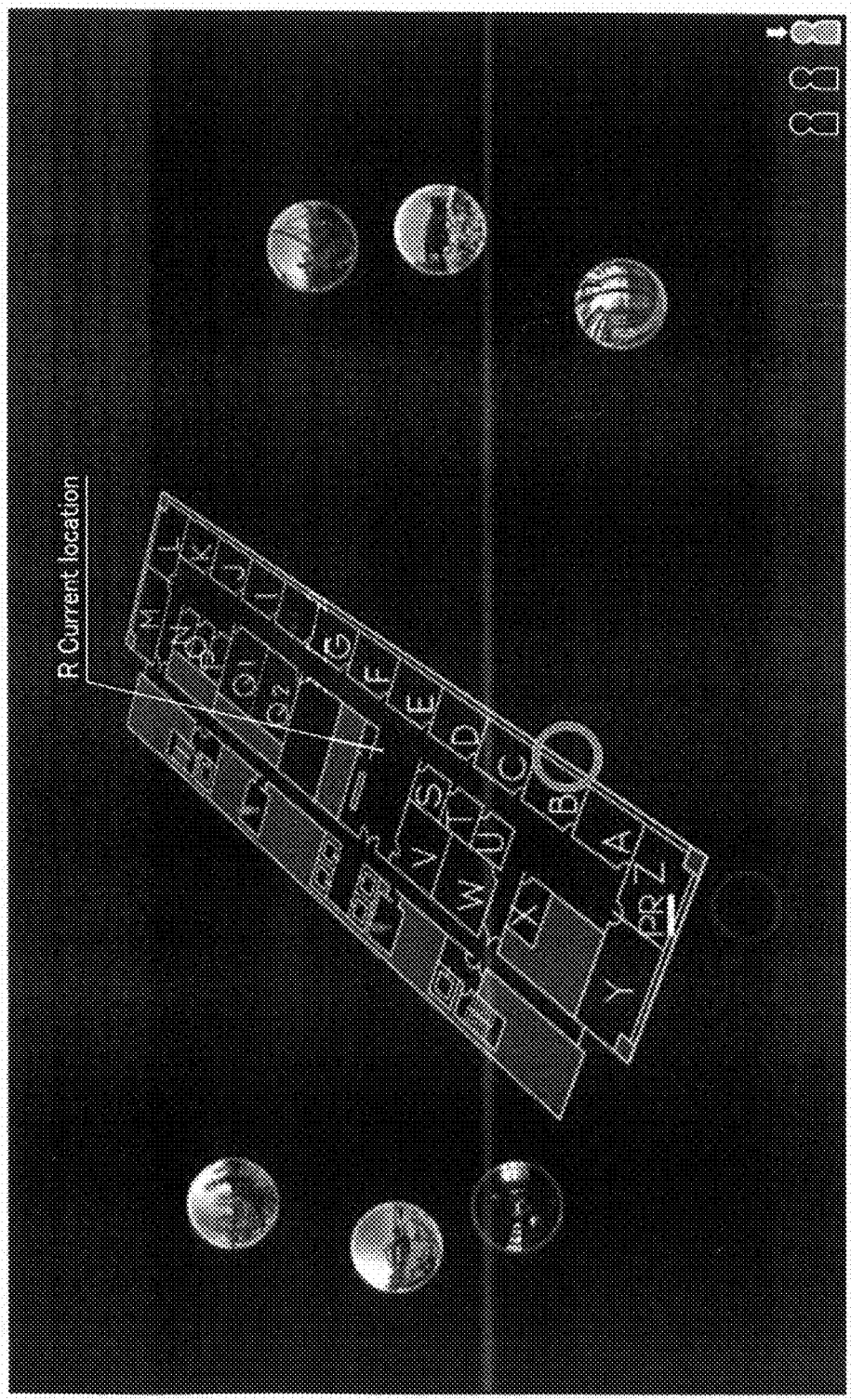
FIG. 10 is an illustration of an example output image, with a cursor being displayed in interaction with the user.
Figure 11:
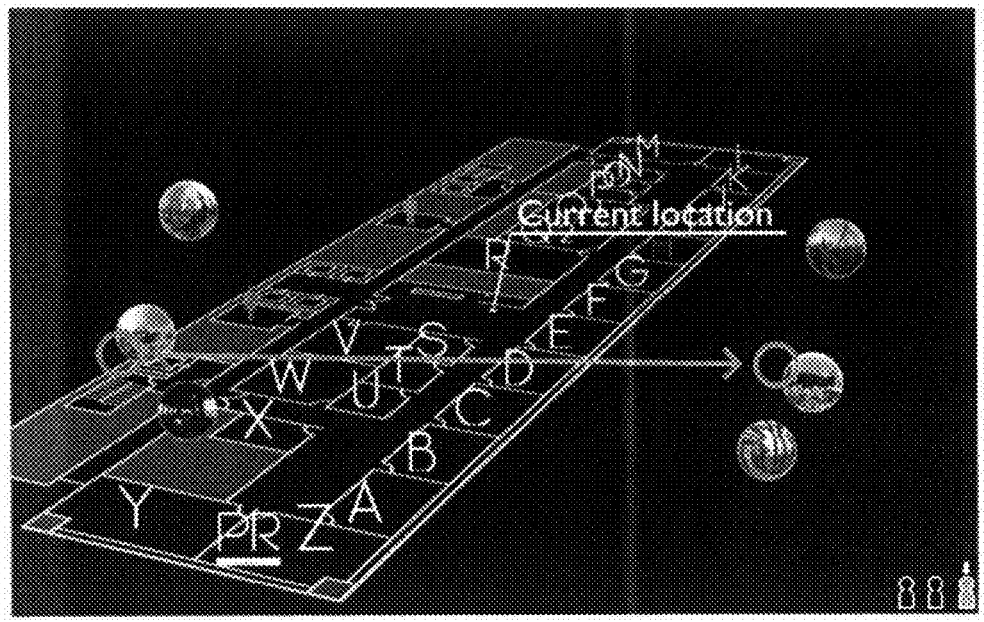
FIG. 11 is an illustration of an example output image, with cursors and a bar being displayed in interaction with the user.

Further, the output image generator 24 determines the location of a cursor to be displayed on the output image based on the analysis result of the operator recognizer 23, which recognizes the user who is an operator. More specifically, the output image generator 24 generates the output image having the cursor that is located to be near at least one hand of the user (operator), and displays the output image through the projector 30, as illustrated in FIGS. 10 and 11.

More specifically, the output image generator 24 obtains the coordinate of at least one hand of the user (operator) having the instructing pose, which is recognized by the operator recognizer 23. The output image generator 24 multiplies the X and Y coordinate values of the at least one hand having the instructing pose, with the parameters Px and Py calculated by the parameter calculator 63, respectively, to output the corrected coordinate X and Y values of the at least one hand of the user having the instructing pose. The output image generator 24 generates the output image having a cursor placed, at a location defined by the corrected coordinate values of the at least one hand of the user having the instructing pose. Referring to FIG. 10, the cursor is displayed in the form of a circle, near the room B.

If the parameter calculator 63 outputs the parameters PRx and PLx, and Py, as the user's location is shifted in X direction with respect to the reference point (0, 0) of the output image, the output image generator 24 multiplies the X coordinate value of the right hand having the instructing pose, with the parameter PRx, and multiplies the Y coordinate value of the right hand having the instructing pose, with the parameter Py. Similarly, the output image generator 24 multiplies the X coordinate of the left hand having the instructing pose, with the parameter PLx, and multiplies the Y coordinate value of the left hand having the instructing pose.

In this example, if the right or left hand is determined to have the instructing pose, the parameter calculator 63 displays a cursor on the right or left hand that is determined to have the instructing pose. Alternatively, if both of the right and left hands are determined to have the instructing pose, the parameter calculator 63 displays a cursor on each of the right and left hands. Referring to FIG. 11, the cursors are displayed on the right and left locations, relative to near the center of the map image.

Further, in this example, the cursor corresponding to the right hand of the user is displayed in blue, and the cursor corresponding to the left hand of the user is displayed in pink.

Further, as illustrated in FIGS. 10 and 11, when the captured user image includes more than one user, the output image may additionally include a plurality of user icons reflecting the users in the captured user image, at the lower right portion of the output image. Of the user icons being displayed, the user icon reflecting the operator is displayed with an arrow on the top.

The output image of FIG. 10 is displayed, when the right hand of the user (operator) is recognized as having the instructing pose. In such case, the icons corresponding to the right hand of the user are displayed in darker color to indicate that these icons are operable with the right hand of the user. The icons corresponding to the left hand of the user are displayed in lighter color to indicate that these icons are not operable with the left hand of the user.

The output image of FIG. 11 is displayed, when the right hand and left hand of the user (operator) are recognized as having the instructing pose. In such case, the icons corresponding to the right hand of the user, and the icons corresponding to the left hand of the user, are both displayed in darker color to indicate that these icons are operable. Further, in FIG. 11, a bar that connects the right cursor and the left cursor is additionally displayed on the output image to indicate that action, such as pinch, may be taken to instruct enlargement or reduction of a specific area of the output image.

Referring back to FIG. 2, the symbol data DB 26 stores therein information regarding cursors such as in the form of cursor data table of FIG. 12, and information regarding bars such as in the form of bar data table of FIG. 13. In on example, the output image generator 24 selects one or two of the cursors from the cursor data table of FIG. 12, and/or selects one of the bars from the bar data table of FIG. 13. In this example, the output image generator 24 obtains data and/or bar data, from the cursor data table of FIG. 12 and/or the bar data table of FIG. 13, which match the characteristics data determined by the characteristics determiner 21. The output image generator 24 displays the cursor and/or the bar on the output image, using the obtained cursor data and/or the bar data.

For example, the output image generator 24 selects the cursor data or the bar data, which matches the body type (such as height or arm length) or personality, of the characteristics data of the user who is operating. In case the body type of the user (operator) indicates a height higher than a threshold, the output image generator 24 selects the cursor and/or the bar having a large size. In case the body type of the user (operator) indicates a height shorter than the threshold, the output image generator 24 selects the cursor and/or the bar having a small size. In case the personality of the user (operator) is fast-tempo, the output image generator 24 selects the cursor having a high moving speed, and/or the bar having a high expansion/contraction speed. In case the personality of the user (operator) is slow-tempo, the output image generator 24 selects the cursor having a low moving speed, and/or the bar having a low expansion/contraction speed.

Further, in case of displaying the cursor corresponding to the user's dominant hand, the output image generator 24 selects the cursor data having a particular color such as red, the cursor data having a darker color, or the cursor data having less transparency. In case of displaying the cursor corresponding to the user's non-dominant hand, the output image generator 24 selects the cursor data to have appearance different than that of the user's dominant hand.

The instruction recognizer 27 recognizes the user's gesture to the output image projected by the projector 30, based on the captured user image captured by the image capturing device 10. Examples of gesture include, but not limited to: 1) a gesture of moving the arm having the instructing pose, up, down, right, or left; 2) a gesture of changing a distance between the arms each having the instructing pose. The gesture 1) of moving the arm is interpreted as scrolling the cursor on the output image. The gesture 2) of changing the distance between the arms is interpreted as pinching to enlarge or reduce the size of content on the output image.

The controller 28 controls display of the output image by the projector 30, based on the characteristics data determined by the characteristics determiner 21, and the gesture recognized by the instruction recognizer 27.

For example, when the instruction recognizer 27 recognizes the scrolling gesture on the output image illustrated in FIG. 10, the controller 28 scrolls the cursor on the output image in the direction as instructed by the gesture. For example, if the scrolling gesture is movement of the arm having the instructing pose, to the right direction, the controller 28 scrolls the cursor on the output image in the right direction.

In such case, the controller 28 moves the cursor in a speed, according to the cursor data that is selected by the output image generator 24 using the characteristics data of the user, and in a distance determined by the parameter calculated by the parameter calculator 63 and a distance of movement of the user's arm. Since the output image is displayed on the large-size screen, a small person, including a child, can hardly move the cursor to a desired position with one gesture, unless an instruction area is corrected using the parameter as described above. As described above, in this embodiment, a distance that the cursor moves in one action (gesture) is corrected for each user who is operating, using the parameters for X direction and Y direction that are obtained for each user. Accordingly, the small person can easily move the cursor to the desired position with one gesture.

The output image generator 24 generates (or updates) the output image, which reflects the user instruction under control of the controller 28, and displays the output image onto the projection medium 40 through the projector 30.

In this embodiment, by scrolling the cursor in circular direction, the map image may be rotated around the center of the image (that is, the current location) in either 2D or 3D space.

Further, by selecting a specific icon image on the map image with the cursor (pointing the specific icon image with the cursor for a predetermined time period), the map image is switched to a spherical panorama image associated with the selected icon image.

Figure 14:
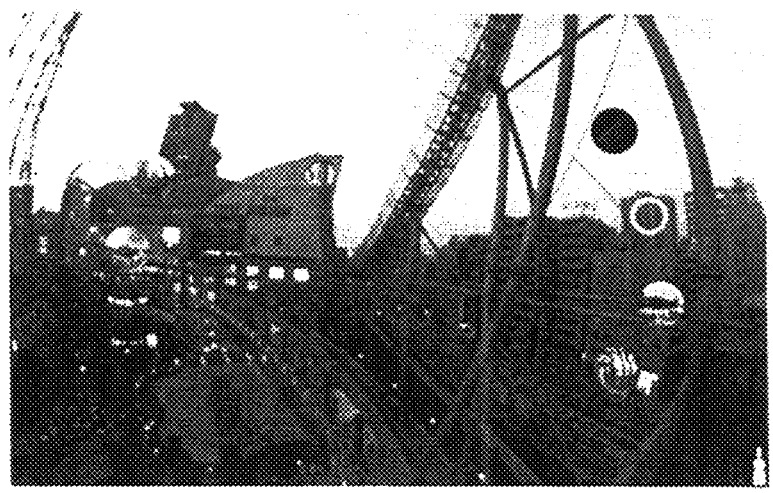
FIG. 14 is an illustration of an example output image, which is switched to a spherical panorama image.

FIG. 14 illustrates an example spherical panorama image, which is displayed as the output image when the icon image is selected. On a location of the output image where the selected icon image was previously displayed before switching, an icon image reflecting the floor map image is displayed. By pointing this floor map icon image with the cursor for a predetermined time period, the spherical panorama image is switched back to the floor map image.

When the instruction recognizer 27 recognizes the gesture of pinching while the output image of FIG. 11 is displayed, the controller 28 enlarges or reduces the size of content on the output image. For example, when a distance of the arms, which are recognized as having the instructing pose, is made smaller, the controller 28 reduces the size of the floor map image in the direction of arm movement such that the bar size is reduced. When a distance of the arms, which are recognized as having the instructing pose, is made larger, the controller 28 enlarges the size of the floor map image in the direction of arm movement such that the bar size is enlarged.

In such case, the controller 28 enlarges or reduces the size of the floor map image, according to the expansion/contraction speed of the bar data that is obtained by the output image generator 24 based on the characteristics data, and to be in size that is determined using the parameter calculated by the parameter calculator 63 and a distance of the arms of the user. Since the output image is displayed on the large-size screen, a small person, including a child, can hardly enlarge the floor map image to a desired size with one gesture, unless an instruction area is corrected using the parameter as described above. As described above, in this embodiment, an enlargement ratio of the floor map image for one action (gesture) is corrected using the parameters for X direction and Y direction obtained for each user. Accordingly, the small person can easily enlarge the floor map image to have the desired size with one gesture.

Through scrolling or pinching, the user may easily see detailed information of each room on the floor map image, such as its location on the floor map image.

Figure 15:
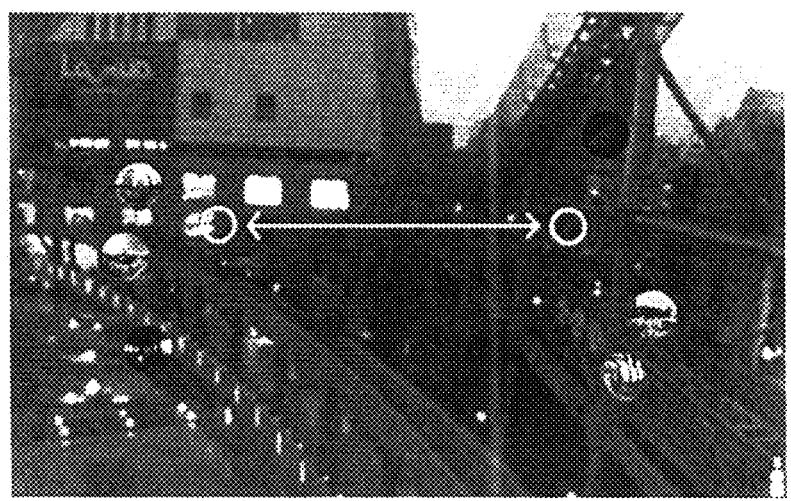
FIG. 15 is an illustration of an example output image, which is displayed after the spherical panorama image of FIG. 14 when expansion is instructed.
Figure 16:
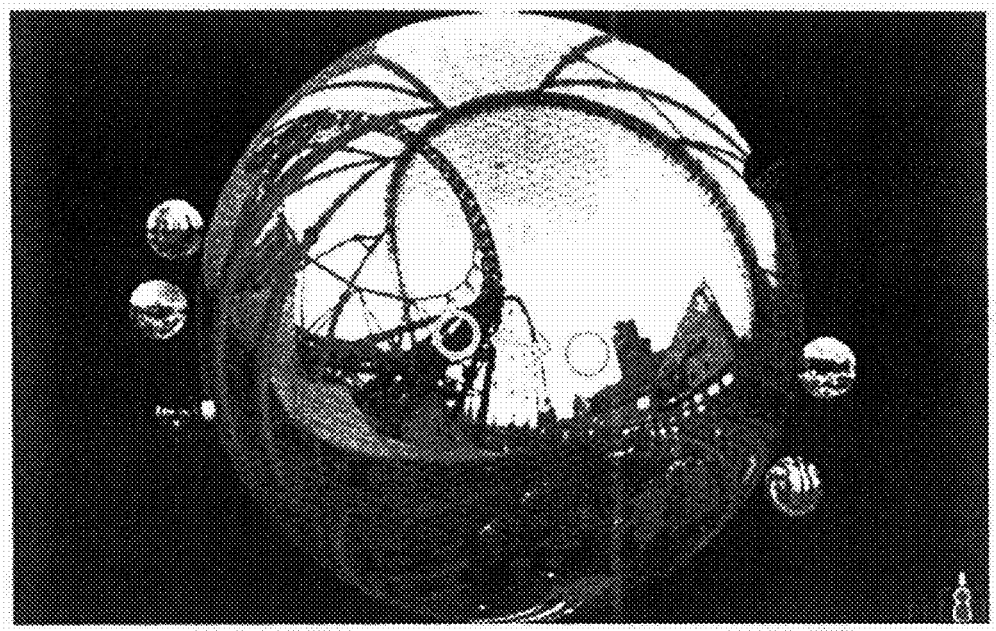
FIG. 16 is an illustration of an example output image, which is displayed after the spherical panorama image of FIG. 14 when contraction is instructed.

The above-described scrolling or pinching may be performed on any desired output image, such as the spherical panorama image illustrated in FIG. 14. FIG. 15 illustrates an enlarged spherical panorama image, which is displayed in response to an instruction for enlarging (pinching) on the spherical panorama image of FIG. 14. FIG. 16 illustrates a reduced-size spherical panorama image, which is displayed in response to an instruction for size reduction (pinching) on the spherical panorama image of FIG. 14.

Figure 17:
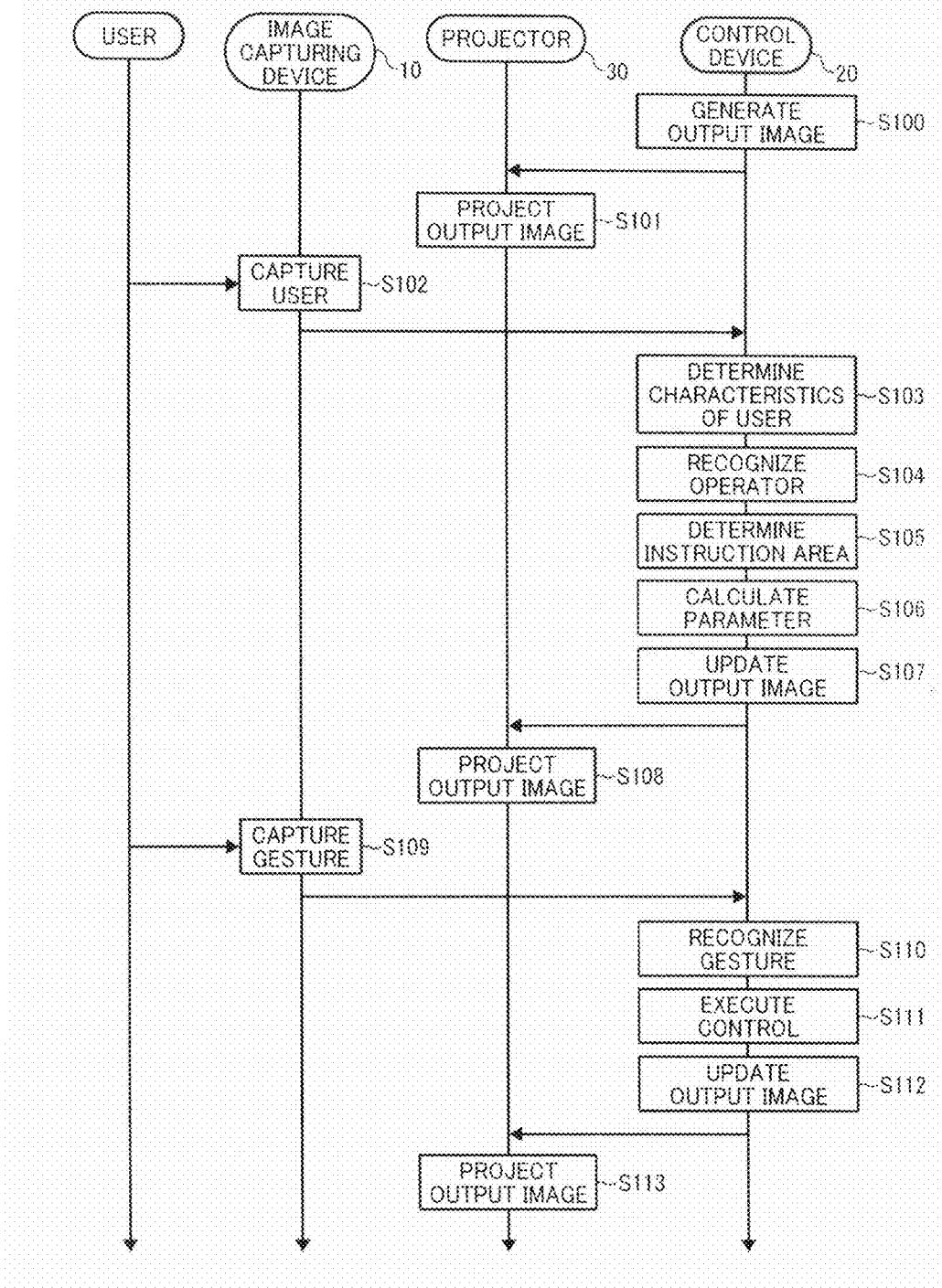
FIG. 17 is a data sequence diagram illustrating operation of controlling display content, performed by the information processing system of FIG. 1, according to an example embodiment of the present invention.

FIG. 17 is a data sequence diagram illustrating operation of updating the output image based on characteristics of the user, performed by the image processing system 1, according to an example embodiment of the present invention.

At S100, the output image generator 24 of the control device 20 generates an output image, for example, the floor map image in association with icons corresponding to the respective rooms on the floor map image.

At S101, the projector 30 projects the output image, generated by the output image generator 24 of the controller 20, onto the projection medium 40.

At S102, the image capturing device 10 captures the image of the user to output the captured user image.

At S103, the characteristics determiner 21 of the control device 20 determines characteristics of the user, based on the captured user image captured by the image capturing device 10. The characteristics determiner 21 stores the characteristics of the user, as the characteristics data, in the characteristics data DB 22.

At S104, the operator recognizer 23 of the control device 20 recognizes the user, who is an operator of the image processing system 1, based on information that can derive from the captured user image.

At S105, the instruction area determiner 62 of the control device 20 determines a size or a location of the instruction area of the user, who is determined as the operator by the operator recognizer 23, using the characteristics data.

At S106, the parameter calculator 63 of the control device 20 calculates a parameter, which is used for determining the location of content to be displayed on the output image, based on the output image size previously stored in the image size data DB 61 and the instruction area size determined by the instruction area determiner 62. The content may be an icon, a cursor, a bar, etc.

At S107, the output image generator 24 of the control device 20 updates the output image, such that display content in the output image reflects the characteristics of the user. For example, the output image generator 24 corrects a location of the cursor (or bar) using the parameter calculated by the parameter calculator 63, such that the cursor location (or bar location) corresponds to at least one hand of the user (operator). Further, the output image generator 24 selects the cursor or the bar such that its appearance matches the characteristics of the user. Further, the output image generator 24 adds a user icon for each of the users captured in the user captured image. The output image generator 24 adds an arrow, which indicates the user who is recognized as the operator by the operator recognizer 23.

At S108, the projector 30 projects the output image, which is updated by the output image generator 24 of the control device 20, onto the projection medium 40.

Assuming that the user, who is recognized as the operator, gestures to give instructions through the output image, at S109, the image capturing device 10 captures the user's gesture in the captured user image. In this example, the image capturing device 10 constantly captures the image of the user.

At S110, the instruction recognizer 27 of the control device 20 recognizes the user's gesture, which is obtained in the captured user image.

At S111, the controller 28 of the control device 20 controls display content of the output image, according to the user's gesture that is recognized by the instruction recognizer 27, while taking into account the characteristics data obtained by the characteristics determiner 21.

At S112, the output image generator 24 of the control device 20 updates the output image so as to have content that reflects the user's gesture and the characteristics of the user.

At S113, the projector 30 projects the output image, which is updated by the output image generator 24 of the control device 20, onto the projection medium 40.

S109 to S113 are repeated, until the user who is the operator finishes giving instructions.

In displaying the output image that reflects the characteristics of the user, in one example, the control device 20 may generate a content image having a content that reflects the characteristics of the user, and displays the generated content image to be on top of the floor map image and the icons that are already displayed as the output image. For example, the content may be a cursor corresponding to at least one hand of the user, a bar to connect two cursors corresponding to hands of the user, etc.

As described above, the control device 10 controls display content of the output image, according to characteristics of a user, such that the output image that reflects the characteristics of the user is output. This enhances operability for each user.

Further, as described above, the control device 10 controls display content of the output image, according to gesture of the user, while taking into account the characteristics of the user, such that the output image that reflects the gesture and the characteristics of the user is output. This enhances operability for each user.

Further, in the above-described embodiment, content of the output image, which is projected onto the large-size screen, changes with the user's gesture, thus providing information with high realistic sensation. As described above, even when the output image is large in size, an instruction area to be used by the operator to give instructions can be adjusted according to the characteristics of the user, such as the user's physical attribute like the user's height. More specifically, display of the output image, such as its display content, is controlled such that the output image reflects characteristics of the user. Examples of display content include icons, a user icon, a cursor, a bar, etc. Accordingly, interaction between the large-size image (user interface) and the user can be made smoother, thus increasing operability of each user.

Display of the spherical panorama image on the large-size screen also contributes to providing information with high realistic sensation.

More specifically, in the above-described embodiment, each room on the floor map image is associated with an icon image, which is a spherical panorama image taken at a location of that room. With this information, the user can feel as he or she were there.

Figure 18:
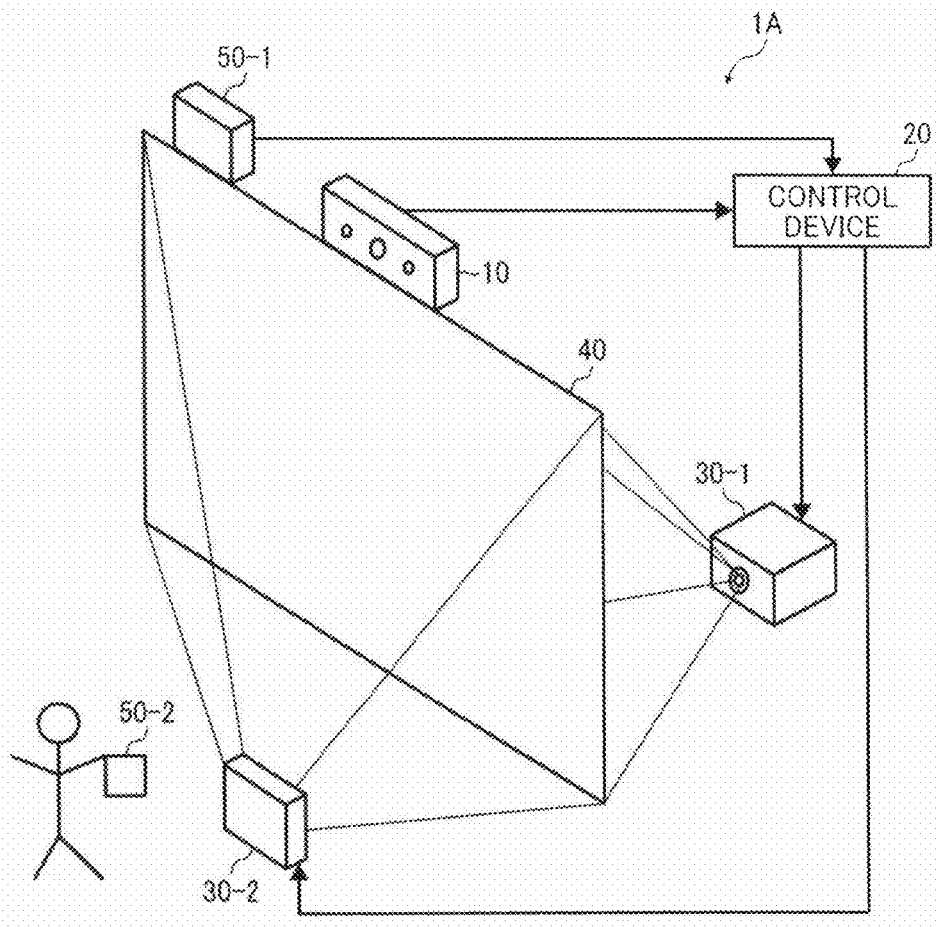
FIG. 18 is an illustration of a configuration of an information processing system according to an example embodiment of the present invention.

Referring now to FIG. 18, a configuration of an information processing system 1A is explained according to an example embodiment of the present invention. The information processing system 1A is substantially similar to the information processing system 1 of FIG. 1, except for addition of a radio frequency identifier (RFID) reader 50-1. The RFID reader 50-1 reads out information from a RFID tag 50-2, which is carried by the user. In this embodiment, the RFID tag 50-2 previously stores authentication information of the user, such as a name of the user and/or a user ID that uniquely identifies the user. The characteristics data DB 22 stores an authority table of FIG. 19, in addition to the characteristics data table of FIG. 4.

The characteristics determiner 21 reads out authentication information from the RFID tag 50-2 via the RFID reader 50-1, and determines whether the read authentication information matches authentication information stored in the authority table of FIG. 19 to generate an authentication result indicating whether the user is a registered user. When the authentication result indicates that the user is the registered user, the characteristics determiner 21 may obtain various information regarding the characteristics of the user, from the characteristics data table of FIG. 4, using the authentication information such as the user ID. When the authentication result indicates that the user is not the registered user, in one example, the characteristics determiner 21 may automatically create a record in the characteristics data table of FIG. 4 as a guest user to allow operation as described above referring to FIG. 17. With this configuration, the control device 20 does not have to determine characteristics of the user, if the user is previously registered in the information processing system 1A.

Further, when the authentication result indicates that the user is the registered user, the control device 20 may allow the user to perform various operation on icon images being displayed together with the floor map image, according to user authority that is managed with the authority table of FIG. 19.

For example, referring to FIG. 19, the user with the user ID "123ABC" is allowed to register a new icon image, delete the exiting icon image, edit the existing icon image, and refer to the exiting icon image. The user with the user ID "234BCD" is allowed to only refer to the exiting icon image. With this configuration, the authorized user can create or modify the icon images according to the user preference.

In such case, the icon image table of FIG. 9 may be managed in association with the registered user. That is, the icon image table of FIG. 9 is created for each registered user. When generating the output image, the output image generator 24 associates the floor map image, managed with the map image table of FIG. 8, with the icon images in the icon image table of FIG. 9 created for the authenticated (registered) user, such the icon images specific to the user are displayed as the output image.

Similarly, the cursor data table of FIG. 12 and/or the bar data table of FIG. 13 may be created for each registered user, according to the user preference. In such case, when generating the output image, the output image generator 24 obtains the cursor data table of FIG. 12 and/or the bar data table of FIG. 13, which is set specific to the authenticated (registered) user, such that the cursor and/or the bar specific to the user are displayed in the output image.

Referring now to FIGS. 20 to 29, a configuration of an information processing system 1001 is explained according to an example embodiment of the present invention. The information processing system 1001 is substantially similar to the information processing system 1A of FIG. 18, except for the addition of a RFID antenna 50-3, a reservation management server 1003, a reservation DB 1004, and a tag DB 1005, and replacement of the control device 20 with a control device 1020. With this configuration, the information processing system 1001 is able to guide the user to a destination.

In this embodiment, RFID is used to transmit or receive tag ID information. Alternatively, any other wireless communication system may be used such as NFC.

The control device 1020 is connected with the reservation management server 1003 via a network 1002, which may be implemented by, for example, the Internet and/or a local area network (LAN).

The RFID antenna 50-3 is installed at a location near the projection medium 40. The RFID antenna 50-3 receives RFID tag identification (RFID tag ID), which uniquely identifies the RFID tag 50-2, from the RFID tag 50-2.

The RFID reader 50-1, which is connected with the RFID antenna 50-3 via wired or wireless network, receives the RFID tag ID of the RFID tag 50-2 from the RFID antenna 50-3, converts the RFID tag ID, and transmits the converted RFID tag ID data to the control device 1020.

The RFID tag 50-2 may be implemented by a passive tag, which receives electric wave of a specific frequency range from the RFID antenna 50-3, and in return transmits the RFID tag ID to the RFID antenna 50-3. Alternatively, the RFID tag 50-2 may be implemented by an active tag, which transmits the RFID tag ID in the electric wave of a specific frequency range to the RFID antenna 50-3. The RFID tag 50-2 may be of passive and active type.

Figure 20:
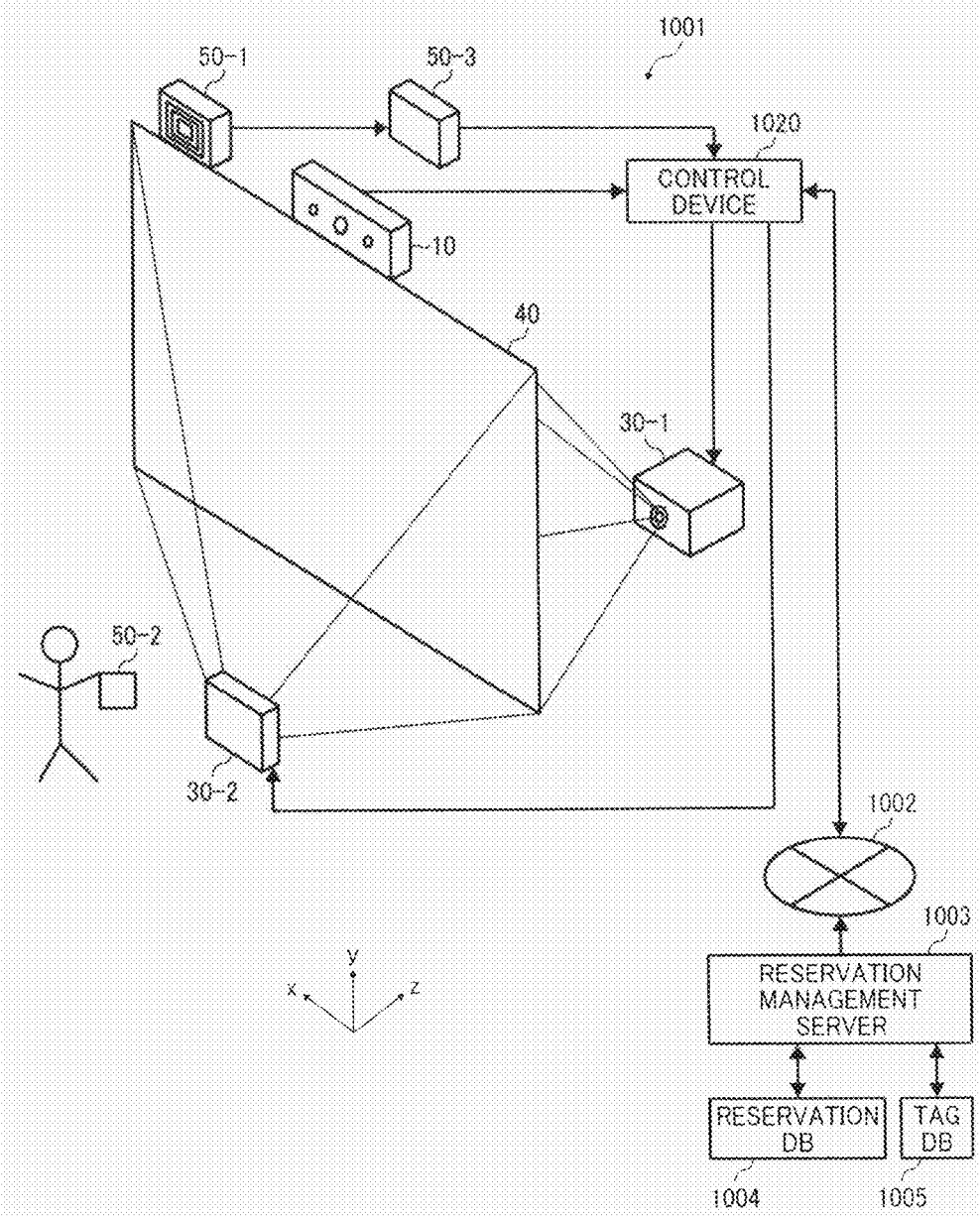
FIG. 20 is an illustration of a configuration of an information processing system according to an example embodiment of the present invention.
Figure 21:
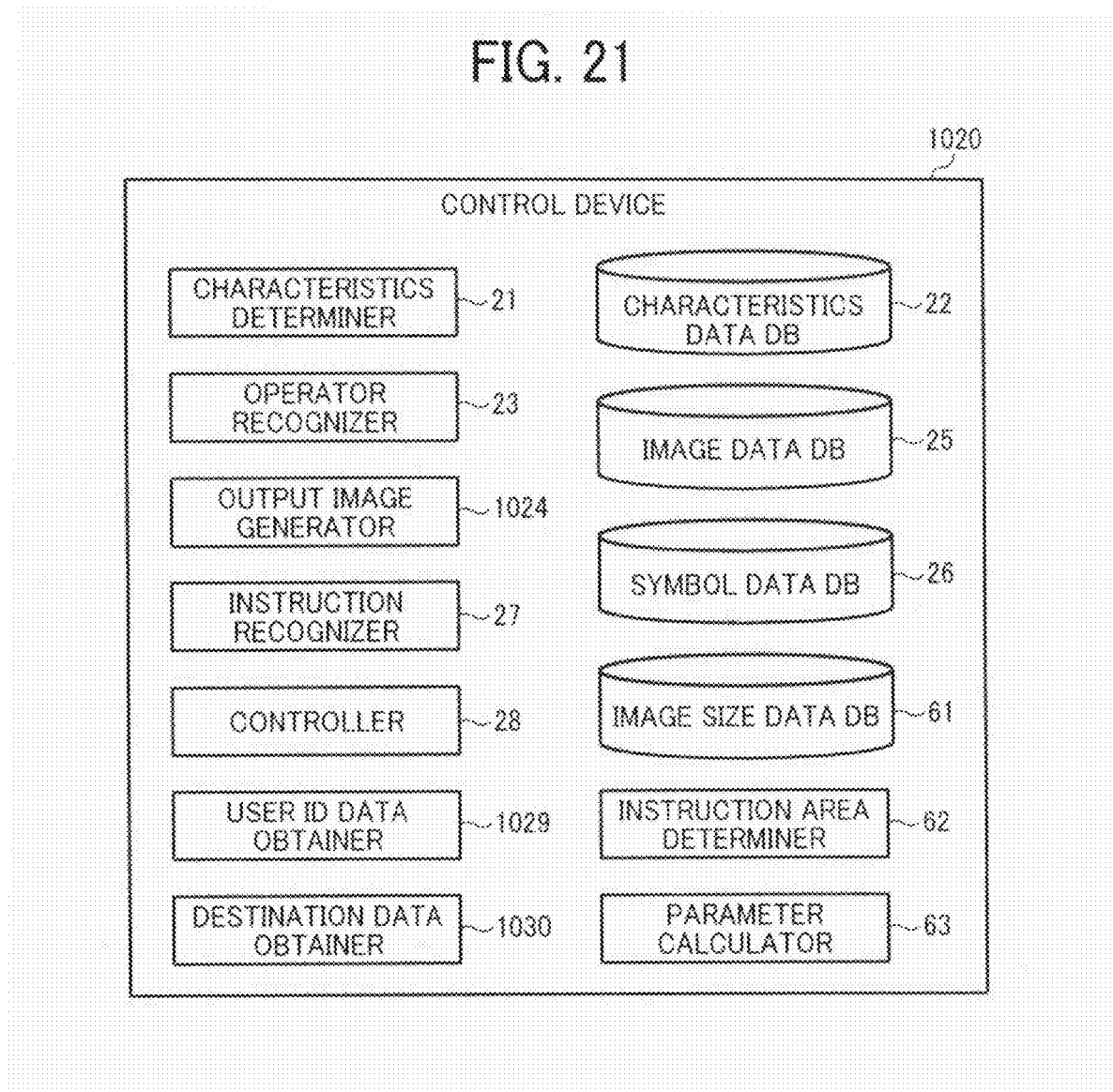
FIG. 21 is a schematic block diagram illustrating a functional structure of a control device of the information processing system of FIG. 20.

FIG. 21 is a schematic block diagram illustrating a functional structure of the control device 1020 of FIG. 20. The control device 1020 is substantially similar to the control device 20 of FIG. 3, except for the addition of a user ID data obtainer 1029 and a destination data obtainer 1030, and replacement of the output image generator 24 with an output image generator 1024.

The user ID data obtainer 1029 obtains the RFID tag ID data, after converted, from the RFID reader 50-1. The RFID tag ID data may be used to obtain user identification (ID) of the user who carries the RFID tag 50-2.

The destination data obtainer 1030 obtains destination information indicating a destination of the user on a map indicated by the floor map image, using the user ID that is obtained by the user ID data obtainer 1029. More specifically, the destination data obtainer 1030 refers to the reservation management server 1003 to obtain destination information of the user, using the RFID tag ID.

The reservation DB 1004 stores reservation information for each room shown on the floor map image. Examples of the reservation information include, but not limited to, a room ID, reserved date/time, status of the room (such as, whether the room is in use, not in use, in cleaning, or unreserved), information regarding a person who reserved the room, and information regarding a visitor (guest) such as a user ID, user name, etc. of the visitor.

The tag DB 1005 stores RFID tag information, such as a tag ID, tag management information (the date/time when the tag is used, frequency of usage, etc.), and user identification information (user ID, user name, etc.) in association with each other.

The reservation management server 1003 manages reservation of each room shown on the floor map image (such as reservation status, or whether the room is in use or not), using the reservation DB 1004 and the tag DB 1005. More specifically, when the RFID tag ID is received from the control device 1020, the reservation management server 1003 determines whether the received RFID tag ID matches any one of the tag IDs managed by the tag DB 1005. When the received RFID tag ID matches the tag ID, the reservation management server 1003 obtains a user ID associated with the received (matched) tag ID, searches the reservation DB 1004 for a record of reservation information storing the obtained user ID as visitor information to further obtain a room ID of that reservation information, and transmits the obtained room ID to the control device 1020 as destination information for that user.

The output mage generator 1024 generates a guide image, which shows a route from the user's current location to the user's destination as indicated by the destination information of the user. The output image generator 1024 further puts the guide image on the floor map image to generate the output image having the floor map image being superimposed with the guide image. The output image generator 1024 outputs the output image through the projector 30 for projection on the projection medium 40.

In this example, the guide image may be previously stored in the auxiliary memory 205 in association with the destination information, that is, each room shown on the floor map image. The guide image may include a route from the location where the projection medium 40 is provided, to each room, and an enhanced image of a room number of each room.

Figure 22:
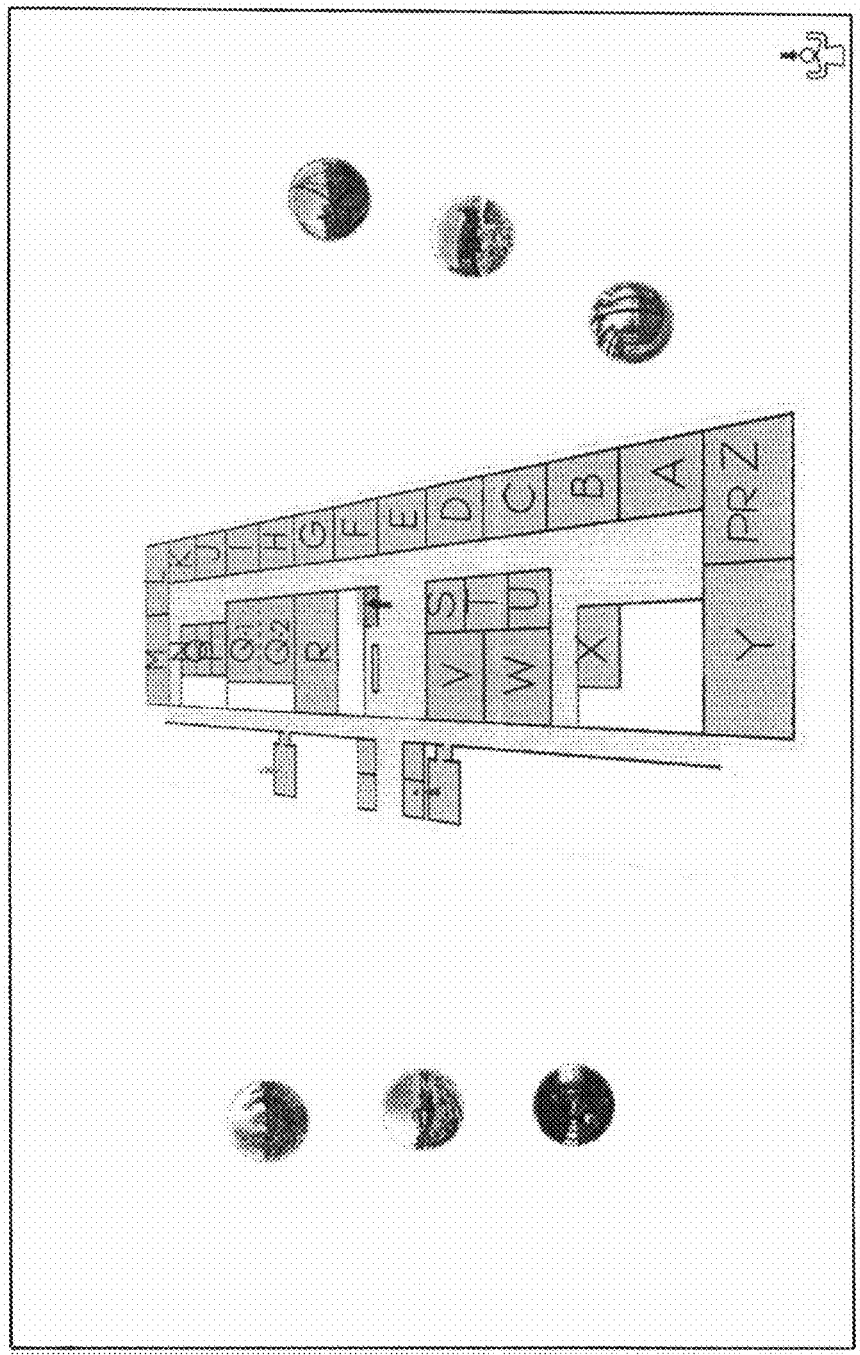
FIG. 22 is an illustration of an example output image generated by the control device of FIG. 21.
Figure 23:
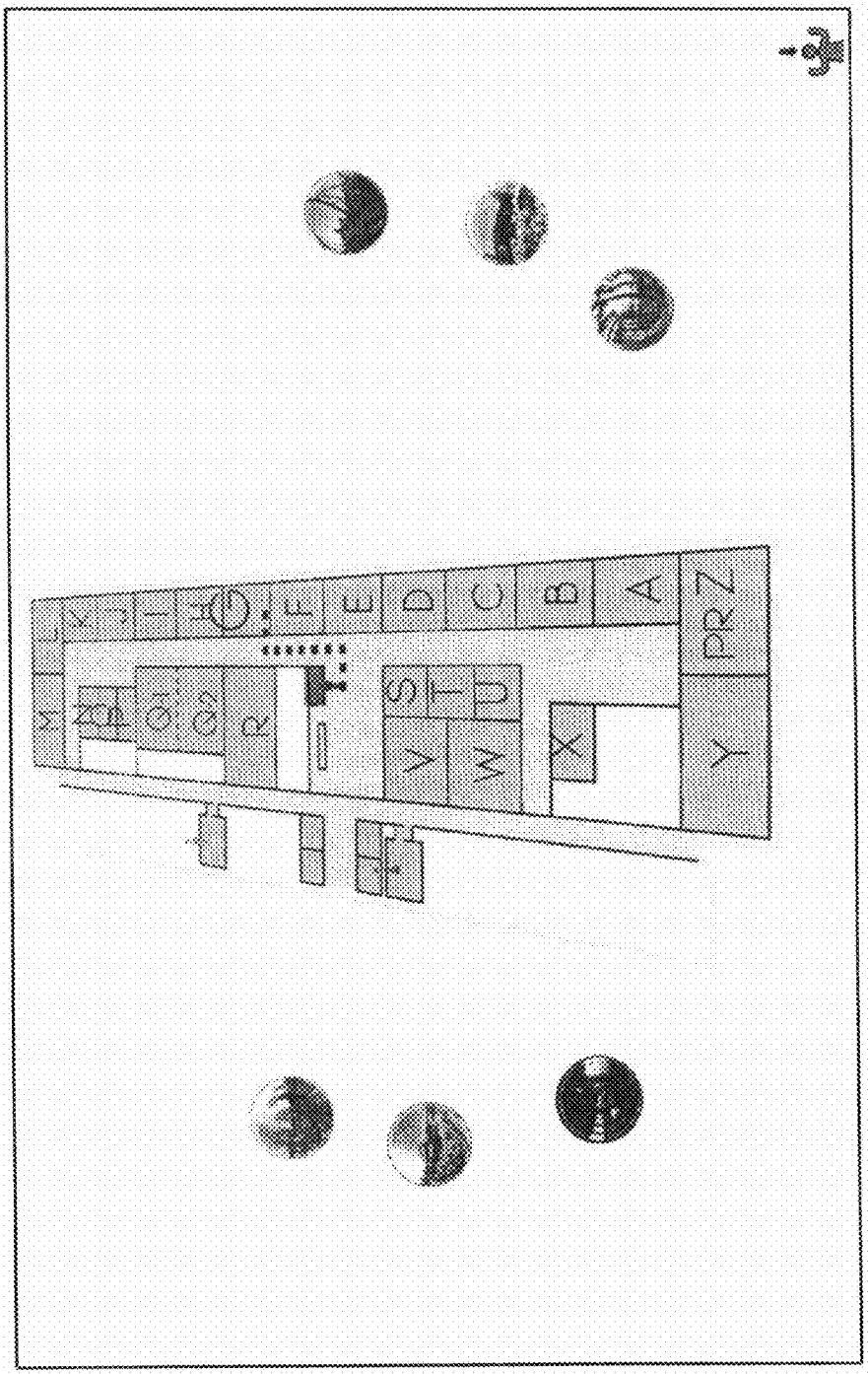
FIG. 23 is an illustration of an example output image, which includes a guide image.
Figure 24:
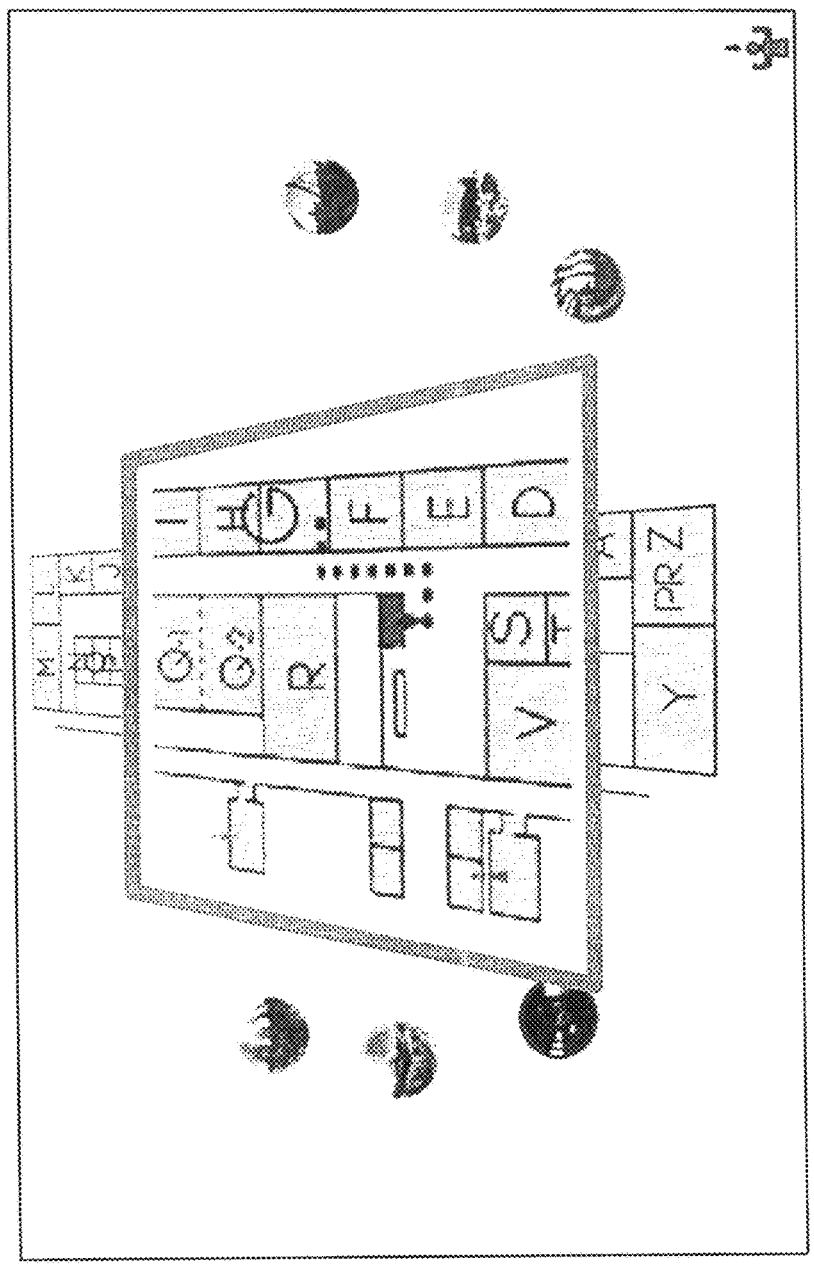
FIG. 24 is an illustration of an example output image, which includes an enlarged guide image.

For example, it is assumed that the output image of FIG. 22 is being displayed to the user, and that the destination data obtainer 1030 obtains destination information indicating the Room G as a destination of the user. In such case, the output image generator 1024 superimposes the floor map image of FIG. 22, with a guide image showing a route from the user's current location (that is, where the projection medium 40 is provided) to the room G, and the enlarged room number "G", and displays the output image as illustrated in FIG. 23. In FIG. 23, the enlarged room number "G" is displayed with a size larger than that of any other room number shown on the floor map image, and in a way that moves up and down by animation. The room numbers other than the room "G" may be displayed differently such as in darker color.

The above-described operation of showing the guide image may be performed periodically, as long as the RFID antenna 50-3 receives the RFID tag from the RFIG tag 50-2.

In the above-described embodiment, the output image may be displayed in various other ways.

Figure 25:
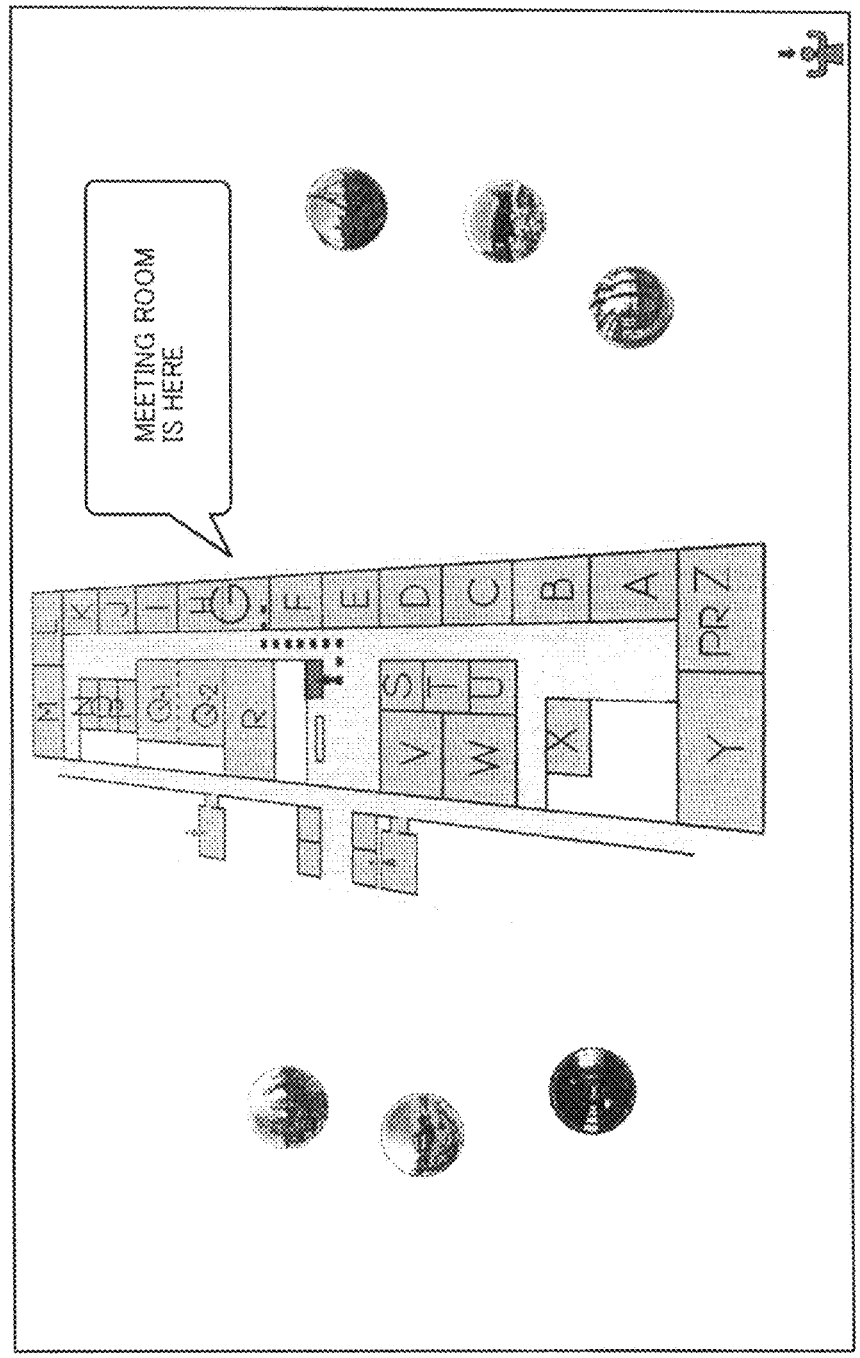
FIG. 25 is an illustration of an example output image, which includes a guide image with a message.

In one example, it may take a longer time for the user to see a destination, even with the guide image. In such case, the user stays in front of the projection medium 40 for a predetermined time period or more. The control device 1020 may determine that the user is taking time to see a destination, when the user ID data obtainer 1029 continuously receives the same tag ID for the predetermined time period or more, or when the characteristics data obtainer 21 analyzes that the user keeps staring at the image for the predetermined time period or more using the captured user image. In such case, the output image generator 1024 may switch display of the output image of FIG. 23, to an output image of FIG. 24 that shows an enlarged section of the guide image. Alternatively, the output image generator 1024 may further display a message such as "meeting room is here" as illustrated in FIG. 25.

Figure 26:
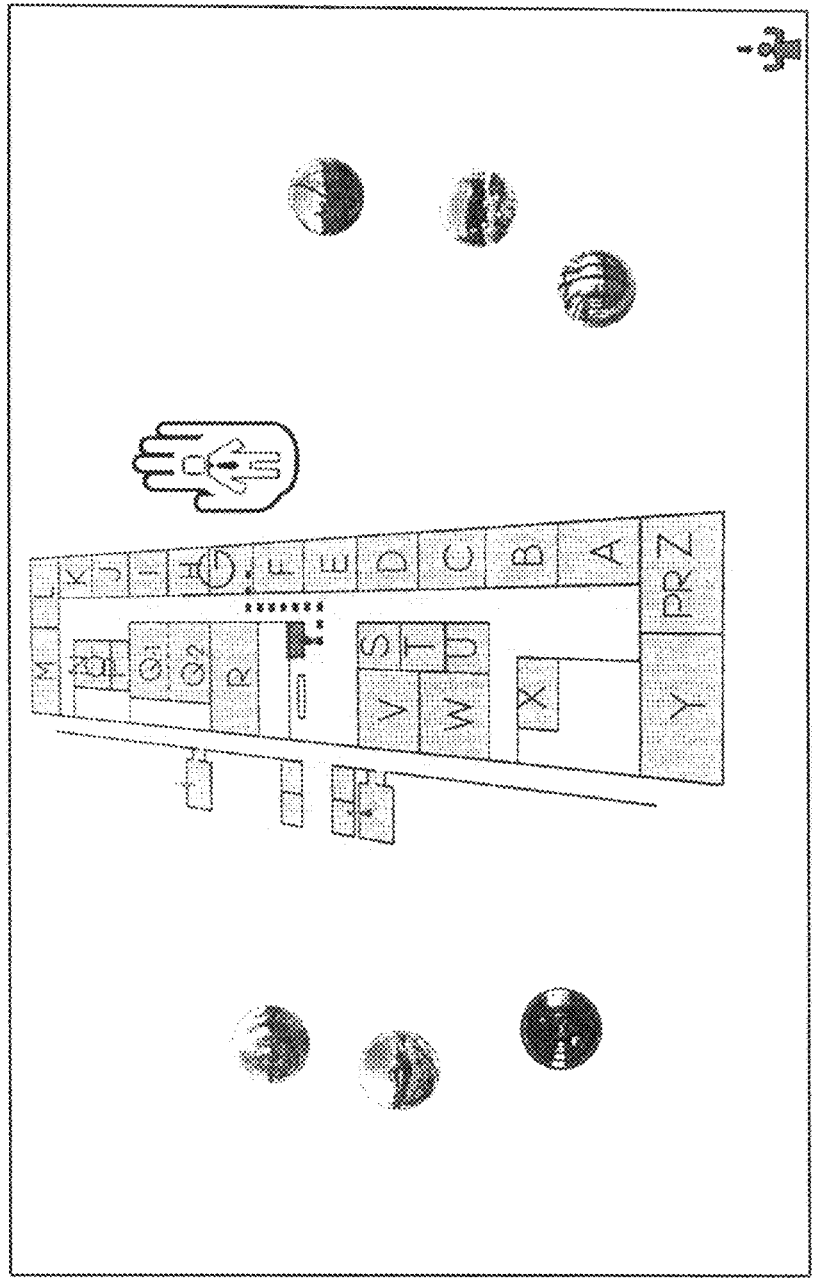
FIG. 26 is an illustration of an example output image, which includes an icon indicating status of a destination room.
Figure 27:
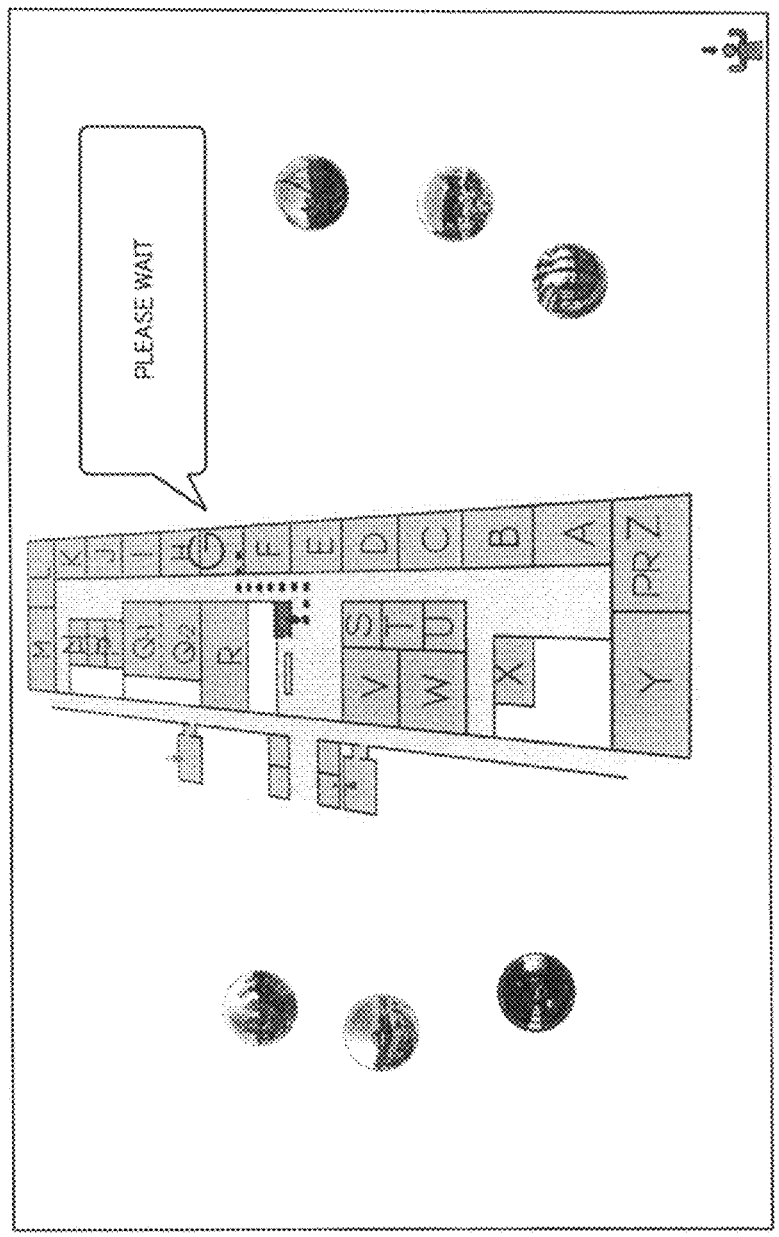
FIG. 27 is an illustration of an example output image, which includes a message indicating status of a destination room.

In another example, content of the output image may be modified according to the current status of the destination room. The reservation management server 1003 obtains the current usage status of the destination room, for transmission to the control device 1020. For example, when the room "G" has been in use, the reservation management server 1003 sends such information indicating that the room "G" is in use to the output image generator 1024. In such case, the output image generator 1024 additionally shows an icon image indicating that the room G has been in use as illustrated in FIG. 26, or a message "Please wait" as illustrated in FIG. 27.

The status of each room, which is managed by the reservation management server 1003, may be managed using RFID tag ID stored in the RFID tag 50-2. For example, the RFID tag, which may be formed as a card, is used as a switch for lighting the room, for example, by inserting the RFID tag (card) into a socket in the room. Further, when the RFID tag is inserted, the RFID tag may be caused to transmit its RFID tag ID. In case the room G is in still use, the RFID tag 50-2, which is used as the switch for lighting, keeps sending its RFID tag ID to the RFID antenna 50-3. As long as the reservation management server 1003 keeps receiving the same RFID tag ID from the control device 1020, the reservation management server 1003 manages the status of the room as it is in use. If a user who is supposed to use the room G arrives, that user will be given a different RFID tag (card) with a different tag ID, for example, at a receptionist. In such case, the different RFID ID may be associated with a user ID of the user who arrives. When the RFID tag is taken from the socket, the RFID tag stops transmitting its RFID tag ID, such that the reservation management server 1003 changes the status of the room to "not used". In this manner, the status of the room is kept updated using the RFID tag ID, which is associated with a user ID of the user who is using that room.

In another example, more than one output image may be displayed, depending on a number of users who are determined to be an operator. For example, assuming that two users stand in front of the projection medium 40, such that the RFID antenna 50-3 receives two different RFID tags from the RFID tags 50-2. Accordingly, the destination data obtainer 1030 may obtain two different destination rooms, as destination information. In this example, it is assumed that a destination for a first user is the Room G, and a destination for a second user is the Room C.

Figure 28:
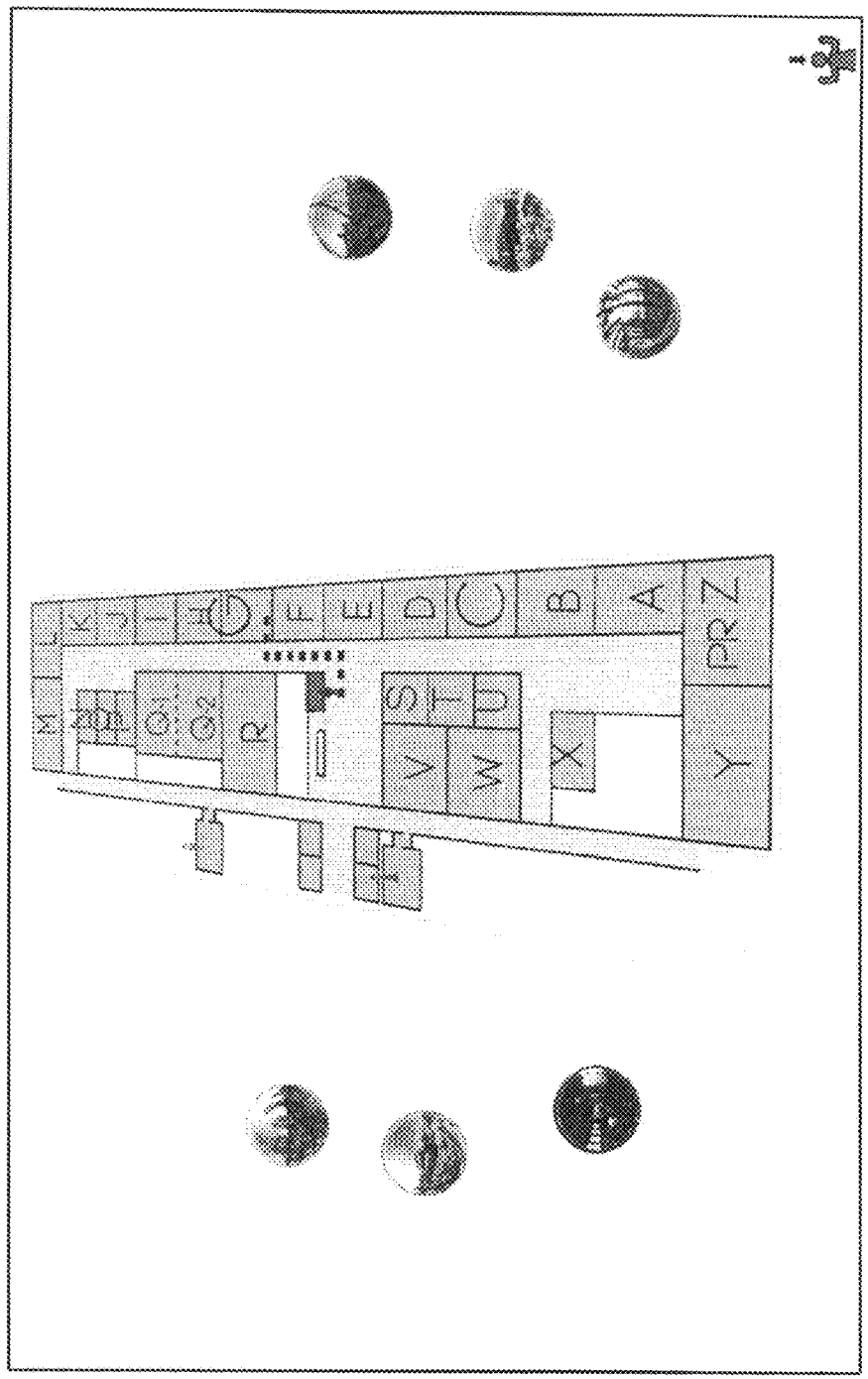
FIG. 28 is an illustration of an example output image, which includes a guide image for a first user.
Figure 29:
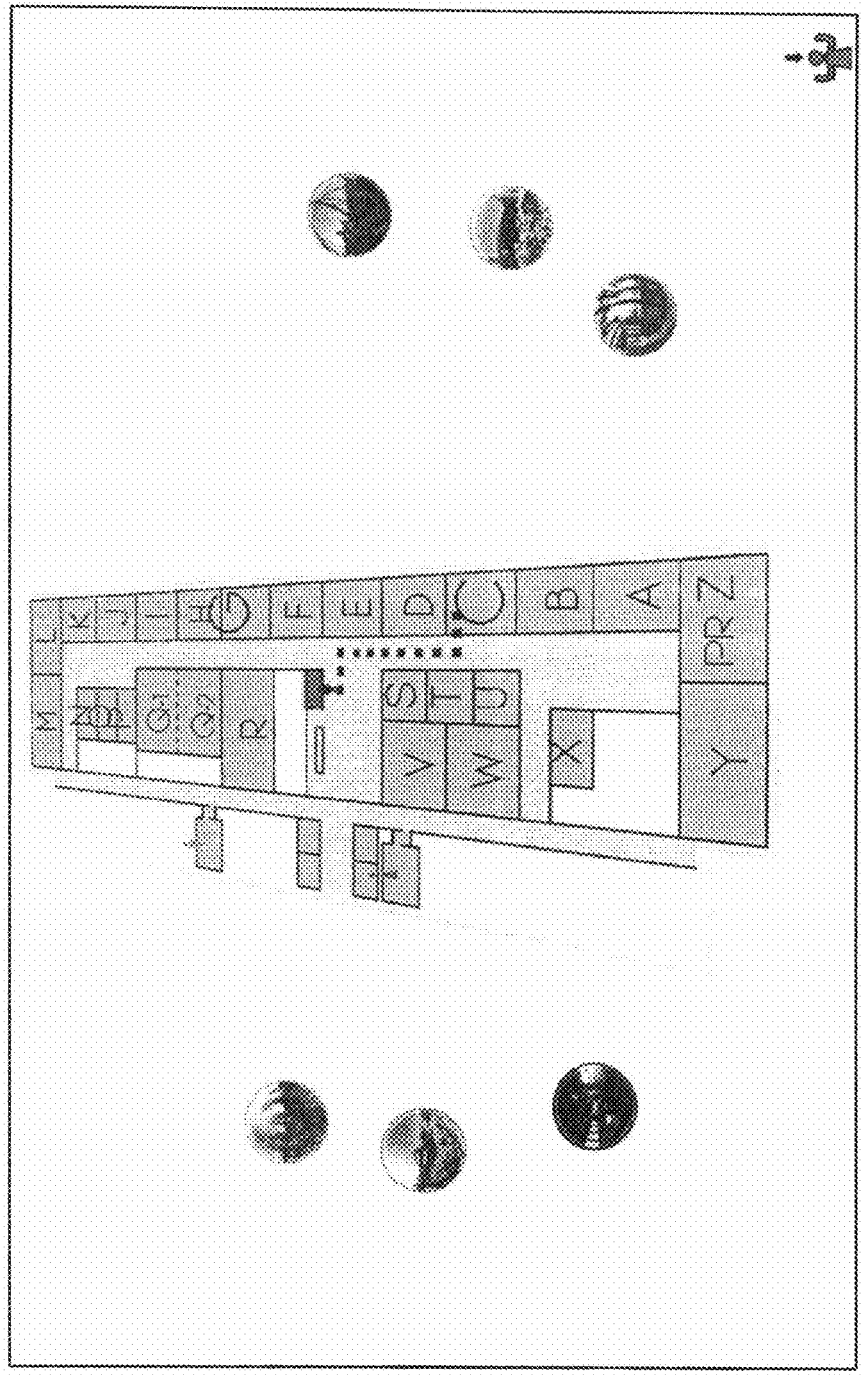
FIG. 29 is an illustration of an example output image, which includes a guide image for a second user.

In such case, the output image generator 1024 generates an output image, which is a floor map image superimposed with a guide image for the room G, as illustrated in FIG. 28. The output image generator 2024 further generates an output image, which is a floor map image superimposed with a guide image for the room C, as illustrated in FIG. 29. The output image generator 1024 may alternately display these output images.

Further, referring to FIGS. 28 and 29, two user icon images may be displayed to indicate that two users are recognized as operators. In such case, the user icon reflecting the first user may be shown with an arrow in the image of FIG. 28 with the guide image for the room G The user icon reflecting the second user may be shown with an arrow in the image of FIG. 29 with the guide image for the room C.

Alternatively, the output image generator 1024 may use the analysis result of the characteristics determiner 21, such as the current location of each user. In this example, it is assumed that the first user is located right, and the second user is located left. In such case, the output image generator 1024 may divide a screen into right section and left section, and project the output image for the room G onto the right section corresponding to the first user and the output image for the room C onto the left section corresponding to the second user.

Figure 30:
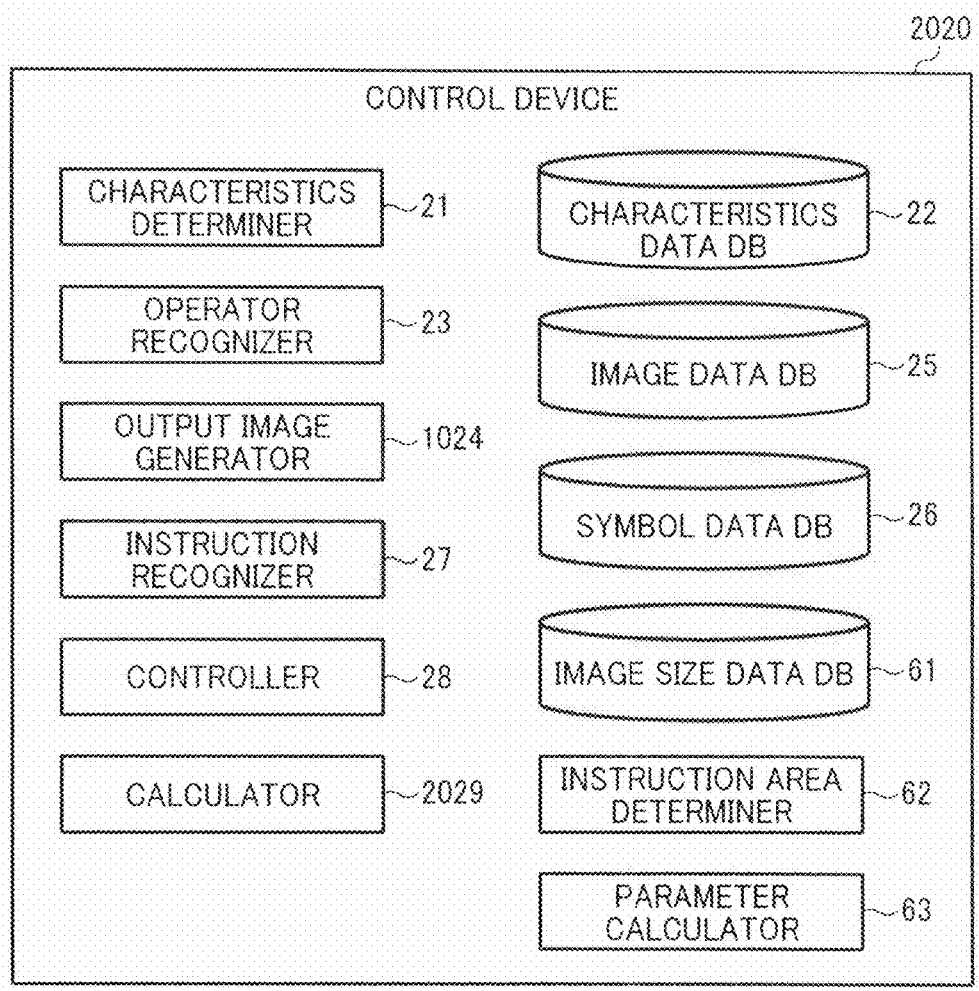
FIG. 30 is a schematic block diagram illustrating a functional structure of a control device, according to an example embodiment of the present invention.
Figure 31:
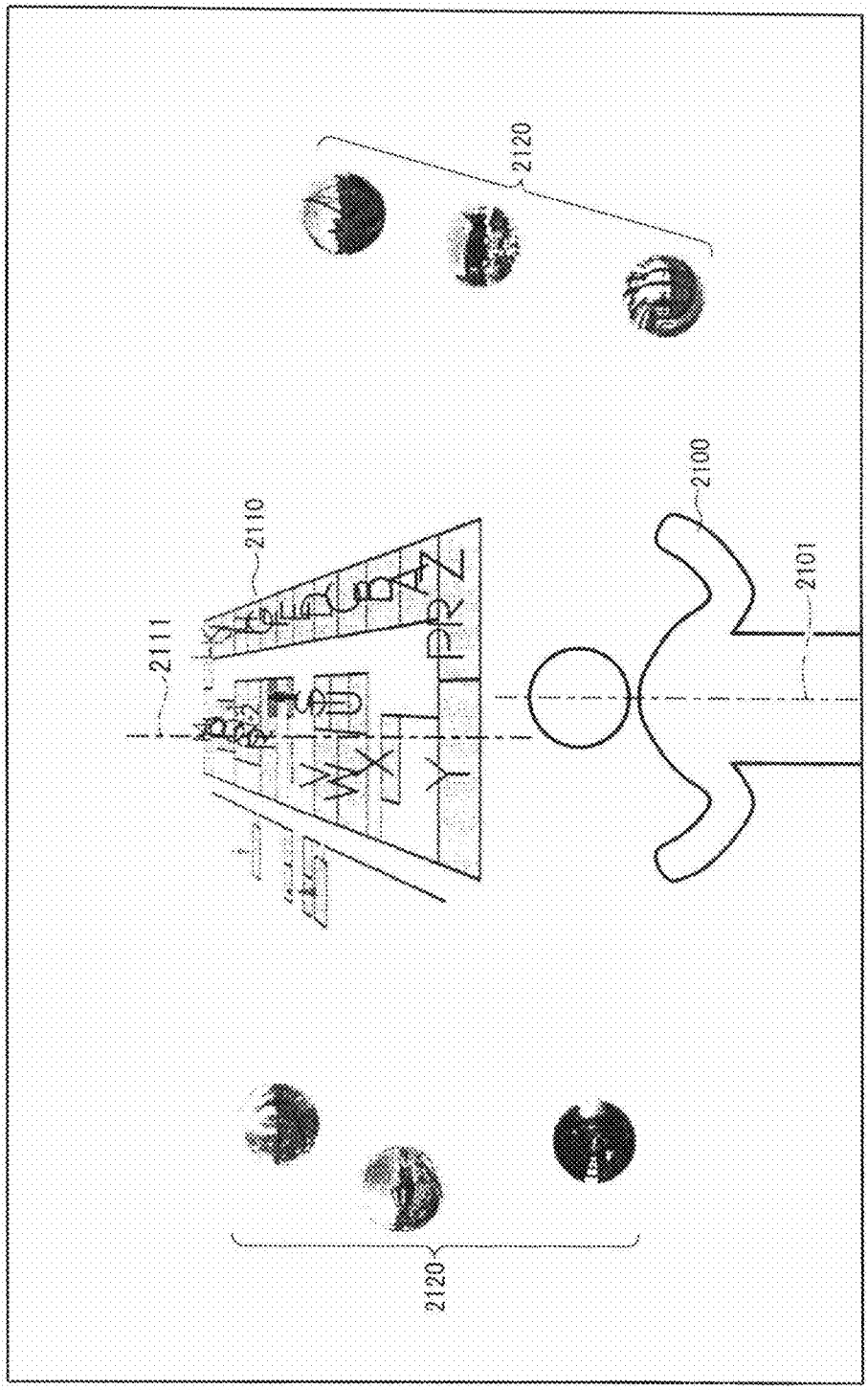
FIG. 31 is an illustration of an example output image, generated by the control device of FIG. 30.

Referring now to FIGS. 30 and 31, a configuration of a control device 2020 is explained according to an example embodiment of the present invention. The control device 2020 is substantially similar to the control device 20 of FIG. 3, except for the addition of a calculator 2029, and replacement of the output image generator 24 with an output image generator 2024.

The calculator 2029 calculates coordinates to be used as user reference data indicating reference parts of the user, using the user characteristics determined by the characteristics determiner 21. The user reference data may be, for example, an axis of the user's body (user reference axis 2101) that can derive from the recognized body parts of the user, such as, from the height (y coordinate) of the head, height (y coordinate) of the torso (upper body), right and left (x coordinate) of the torso, etc. The calculator 2029 further calculates coordinates to be used as image reference data indicating a reference of the floor map image (image reference axis 2111), based on the user reference data. In this example, the image reference data indicating the image reference axis 2111 is generated such that the image reference axis 2111 is aligned with the user reference axis 2101.

The output image generator 2024 generates and arranges a user image reflecting the user, using the user reference data, on the output mage. The output image generator 2024 re-arranges the floor map image and one or more icon images using the image reference data, on the output image. The output image generator 2024 projects the output image having the user image, the floor map image, and the one or more icon images, onto the projection medium 40 through the projector 30.

More specifically, referring to FIG. 31, the output image generator 2024 arranges a user image 2100 such that the user reference axis 2101, which is calculated by the calculator 2029, is placed at the center of the user image 2100. The user image may be generated, for example, based on the captured user image captured by the image capturing device 10. Alternatively, the user image may be generated using information regarding the authenticated user that is obtained using the RFID tag 50-2, which is obtained from the characteristics data table of FIG. 4. Accordingly, the user image may be generated so as to reflect gender, nationality, age, and/or body type of the user.

Still referring to FIG. 31, the output image generator 2024 arranges the floor map image 2110 such that the image reference axis 2111, which is calculated by the calculator 2029, is placed at the center of the floor map image 2110. The output image generator 2024 further arranges the one or more icon images 2120 such that the icon images 2120 are placed at locations relative to the image reference axis 2111.

With this configuration, content of the output image is displayed at places that correspond to the user's view.

In any one of the above-described embodiments, the characteristics data DB 22, the image data DB 25, and the symbol data DB 26 may be provided at any location other than the control device 20, such as on any other device provided on a network that is accessible by the control device.

In alternative to projecting the output image through the projector 30, any desired output device such as a display, which preferably has a large display size, may display the output image.

In any one of the above-described embodiments, icon images may be displayed in various ways. For example, when the icon images and the background images (map images) are substantially similar in brightness (for example, in RGB values), the icon images can be hardly distinguished. In such case, the icon images may be bordered with different color or with shadow. For example, when a difference between the icon image and the background image surrounding that icon image in brightness (RGB values) is less than a threshold, the output image generator 24 may border that icon mage with different color or with shadow. The different in brightness may be obtained based on the image captured by the image capturing device 10.

In one example, when the background image corresponds to a picture with black-like (dark) colors such as a picture of streets, the icon image is bordered with a line "a" having a white color and a thickness level "1". When the background image corresponds to a picture with greenish colors such as a picture of trees or mountains, the icon image is bordered with a line "b" having a white color and a thickness level "2". When the background image corresponds to a picture with reddish colors such as a picture of foliage or sunset, the icon image is bordered with a line "c" having a white color and a thickness level "3". When the background image corresponds to a picture with white-like colors such as a picture of cloud or snow, the icon image is bordered with a line "d" having a black color and a thickness level "1".

In a substantially similar manner, colors of the cursor and the bar may be controlled while considering colors of the background image.

In one example, when the background image corresponds to a picture with black-like (dark) colors such as a picture of streets, the cursor and the bar are bordered with a line "a" having a light blue, light red color. When the background image corresponds to a picture with greenish colors such as a picture of trees or mountains, the cursor and the bar are bordered with a line "b" having a light blue, light red color. When the background image corresponds to a picture with reddish colors such as a picture of foliage or sunset, the cursor and the bar are bordered with a line "c" having a blue, red color. When the background image corresponds to a picture with white-like colors such as a picture of cloud or snow, the cursor and the bar are bordered with a line "d" having a blue, red color.

In a substantially similar manner, transparency of the cursor and the bar, and appearance of the user icon images (including the arrow) may be controlled while considering interaction with the user. The detection result of the display content, such as the cursor, bar, and the user icon images, may be obtained based on the image captured by the image capturing device 10.

In one example, when the detection result is 76 to 100%, the cursor or the bar is displayed with transparency rate of 0%, and the user icon image is displayed with abordered rectangle painted with a pattern "a". When the detection result is 51 to 75%, the cursor or the bar is displayed with transparency rate of 25%, and the user icon image is displayed with a bordered rectangle painted with a pattern "b". When the detection result is 26 to 50%, the cursor or the bar is displayed with transparency rate of 50%, and the user icon image is displayed with a bordered rectangle painted with a pattern "c". When the detection result is 0 to 25%, the cursor or the bar is displayed with transparency rate of 0 to 25%, and the user icon image is displayed with a bordered rectangle.

In any one of the above-described embodiments, the output image generator 24 may arrange the icon images to be on the side of the output image corresponding to the dominant arm of the user.

Moreover, the output image and the icon image are not limited to the above-described embodiments.

For example, the map image, which is initially displayed to the user who is determined to be an operator, may be a map image of a specific event such as the Olympic games. In such case, each icon image, which is a spherical panorama image, corresponds to a picture taken at the facility where a specific game (competition) is being held. In such case, a video image showing the specific game at the facility, which may be distributed over television network or the Internet, may be displayed, when the icon image is being selected by the user.

In another example, the map image may be a layout image of a house. In such case, each icon image corresponds to a picture taken at each room of the house.

In another example, the map image may be a layout image of a chapel. In such case, each icon image corresponds to a picture of scenery viewed from the chapel for each season.

In any one of the above-described embodiments, the display control program, which may be operated by any one of the above-described control devices 20, 1020, and 2020, may be stored in an installable or executable format, on any desired memory. Examples of memory include, but not limited to, CD-ROM, CD-R, memory card, DVD, and flexible disk.

Alternatively, the display control program executable by any one of the control devices 20, 1020, and 2020 may be stored on a computer that resides on any desired network such as the Internet. Such display control program may be downloaded from the network.

Moreover, the display control program executable by any one of the control devices 20, 1020, and 2020 may be distributed via any desired network such as the Internet, or in the form of a non-transitory recording medium such as ROM.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, characteristics of the user are not limited to the above-described embodiments such that any other information that describes characteristics of the user may be obtained from the captured user image. For example, such user characteristics data may be based on information regarding coordinate information of body parts of the user, or information that can derive from motion of body part of the user.

Further, the information processing system may be implemented in various ways other than the above-described embodiments. For example, the control device that controls display of an output image according to characteristics of the user obtained from the captured user image may be provided remotely from the projection medium on which the output image displayed, or from the image capturing device. Alternatively, at least a part of the control device may be incorporated in any one of the image capturing device or the projection medium. Further, the processes performed by the control device may be combined into a single server apparatus as described above, or divided between a plurality of machines. Further, the projection medium may be any medium capable of displaying the output image thereon, such as a fog.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. An information processing apparatus, comprising:
a communication device configured to receive, from an image capturing device, a captured image including a captured user image and a captured output image, wherein the captured user image includes an image of a user captured in an image capturing area of the image capturing device while the output image is displayed to the user, the output image includes a floor map image and an icon image, the floor map image being an image indicating a layout of one or more rooms on a floor, and the icon image includes a plurality of icons that correspond to specific places shown on the floor map image; and processing circuitry configured to:
determine a size of an instruction area specific to the user based on characteristics of the user, the characteristics of the user including a distance between at least two body parts of the user;
define a location of each content to be displayed on the output image, based on the size of the instruction area, a size of the output image, and a center of a user body in the user image relative to the output image;
receive a user selection of one of the plurality of icons corresponding to a specific place on the floor map;
switch the output image to a spherical panorama image that is associated with the icon indicated in the user selection, the spherical panorama image being captured at a specific place shown on the floor map image corresponding to the one icon;
calculate user reference data indicating a reference location of the user on the output image, based on the center of the user body in the captured user image;
calculate first image reference data indicating a reference location of the floor map image based on the user reference data;
arrange a user image that reflects the characteristics of the user at a location defined by the user reference data, the floor map image at a location defined by the first image reference data, and the icon image at a location defined by the location of the floor map image, to generate an updated output image; and
output the updated output image.

2. A method of controlling display of an output image, the method comprising:
receiving, from an image capturing device, a captured image including a captured user image and a captured output image, wherein the captured user image includes an image of a user captured in an image capturing area of the image capturing device while the output image is displayed to the user, the output image includes a floor map image and an icon image, the floor map image being an image indicating a layout of one or more rooms on a floor, and the icon image includes a plurality of icons that correspond to specific places shown on the floor map image;
determining a size of an instruction area specific to the user based on characteristics of the user, the characteristics of the user including a distance between at least two body parts of the user;
defining a location of each content to be displayed on the output image, based on the size of the instruction area, a size of the output image, and a center of a user body in the user image relative to the output image;
receiving a user selection of one of the plurality of icons corresponding to a specific place on the floor map;
switching the output image to a spherical panorama image that is associated with the one icon indicated in the user selection, the spherical panorama image being captured at a specific place shown on the floor map image corresponding to the one icon;

calculating a parameter for defining a location of each content to be displayed on the output image, based on the determined size of instruction area, a size of the output image, and a center of a user body in the captured user image relative to the captured output image recognizing in the captured user image a right hand and a left hand of the user each having an instructing pose to indicate that the user starts giving a user instruction with the right hand and the left hand;

controlling to additionally display on the output image a first cursor corresponding to the right hand, a second cursor corresponding to the left hand, and a bar connecting the first cursor and the second cursor, at locations determined based on the parameter;

detecting in the captured user image a user movement of the right hand and the left hand to change a distance between the right hand and the left hand of the user in a direction along the bar being displayed; and enlarging or reducing a size of the entire output image centering on a location of the user according to the parameter and the changed distance between the right hand and the left hand of the user.

3. A method of controlling display of an output image, the method comprising:

receiving, from an image capturing device, a captured image including a captured user image and a captured output image, wherein the captured user image includes an image of a user captured in an image capturing area of the image capturing device while the output image is displayed to the user, the output image includes a floor map image and an icon image, the floor map image being an image indicating a layout of one or more rooms on a floor, and the icon image includes a plurality of icons that correspond to specific places shown on the floor map image;

determining a size of an instruction area specific to the user based on characteristics of the user, the characteristics of the user including a distance between at least two body parts of the user;

defining a location of each content to be displayed on the output image, based on the size of the instruction area, a size of the output image, and a center of a user body in the user image relative to the output image;

receiving a user selection of one of the plurality of icons corresponding to a specific place on the floor map;

switching the output image to a spherical panorama image that is associated with the one icon indicated in the user selection, the spherical panorama image being captured at a specific place shown on the floor map image corresponding to the one icon;

calculating user reference data indicating a reference location of the user on the output image, based on the center of the user body in the captured user image;

calculating first image reference data indicating a reference location of the floor map image based on the user reference data;

arranging a user image that reflects the characteristics of the user at a location defined by the user reference data, the floor map image at a location defined by the first image reference data, and the icon image at a location defined by the location of the floor map image, to generate an updated output image; and outputting the updated output image.

4. An information processing apparatus, comprising:

a communication device configured to receive, from an image capturing device, a captured image including a captured user image and a captured output image, wherein the captured user image includes an image of a user captured in an image capturing area of the image capturing device while the output image is displayed to the user, the output image includes a floor map image and an icon image, the floor map image being an image indicating a layout of one or more rooms on a floor, and the icon image includes a plurality of icons that correspond to specific places shown on the floor map image; and processing circuitry configured to:

determine a size of an instruction area specific to the user based on characteristics of the user, the characteristics of the user including a distance between at least two body parts of the user;

define a location of each content to be displayed on the output image, based on the size of the instruction area, a size of the output image, and a center of a user body in the user image relative to the output image;

receive a user selection of one of the plurality of icons corresponding to a specific place on the floor map;

switch the output image to a spherical panorama image that is associated with the icon indicated in the user selection, the spherical panorama image being captured at a specific place shown on the floor map image corresponding to the one icon;

calculate a parameter for defining a location of each content to be displayed on the output image, based on the determined size of instruction area, a size of the output image, and a center of a user body in the captured user image relative to the captured output image;

recognize in the captured user image a tight hand and a left hand of the user each having an instructing pose to indicate that the user starts giving a user instruction with the right hand and the left hand;

control to additionally display on the output image a first cursor corresponding to the right hand, a second cursor corresponding to the left hand, and a bar connecting the first cursor and the second cursor, at locations determined based on the parameter;

detect in the captured user image a user movement of the right hand and the left hand to change a distance between the right hand and the left hand of the user in a direction along the bar being displayed; and enlarge or reduce a size of the entire output image centering on a location of the user according to the parameter and the changed distance between the right hand and the left hand of the user.

* * * * *